United States Patent [19]
Schmitt et al.

[11] Patent Number: 5,048,285
[45] Date of Patent: Sep. 17, 1991

[54] CONTROL SYSTEM FOR GAS TURBINE ENGINES PROVIDING EXTENDED ENGINE LIFE

[75] Inventors: Thomas P. Schmitt, Tequesta; Stephen L. Collins, Stuart, both of Fla.

[73] Assignee: Untied Technologies Corporation, Hartford, Conn.

[21] Appl. No.: 499,098

[22] Filed: Mar. 26, 1990

[51] Int. Cl.$^5$ .............................................. F02C 9/00
[52] U.S. Cl. ...................................... 60/204; 60/233; 60/39.24; 364/431.02
[58] Field of Search ................. 60/204, 233, 235, 236, 60/237, 238, 239, 242, 261, 39.24; 364/431.02

[56] References Cited
U.S. PATENT DOCUMENTS

| | | | |
|---|---|---|---|
| 4,258,545 | 3/1981 | Slater | 60/238 |
| 4,423,594 | 1/1984 | Ellis | 364/431.02 |
| 4,425,614 | 1/1984 | Barron et al. | 364/431.02 |
| 4,809,500 | 3/1989 | Roberts | 60/235 |
| 4,959,955 | 10/1990 | Patterson et al. | 60/204 |

Primary Examiner—Louis J. Casaregola
Attorney, Agent, or Firm—McCormick, Paulding & Huber

[57] ABSTRACT

A control system for use in gas turbine engines simultaneously provides for improved engine efficiency and extended engine life without sacrificing engine performance. The control system is characterized by both standard and extended engine life (EEL) operating modes. The extended engine life (EEL) mode can be requested by the pilot during periods of less extreme flight maneuvers. The control system will, in response to pilot request, determine the current thrust provided by the engine and reconfigure the engine to provide that value of thrust at values of engine pressure ratio (EPR) as a function of engine airflow which produce a reduction in turbine inlet temperature.

13 Claims, 17 Drawing Sheets

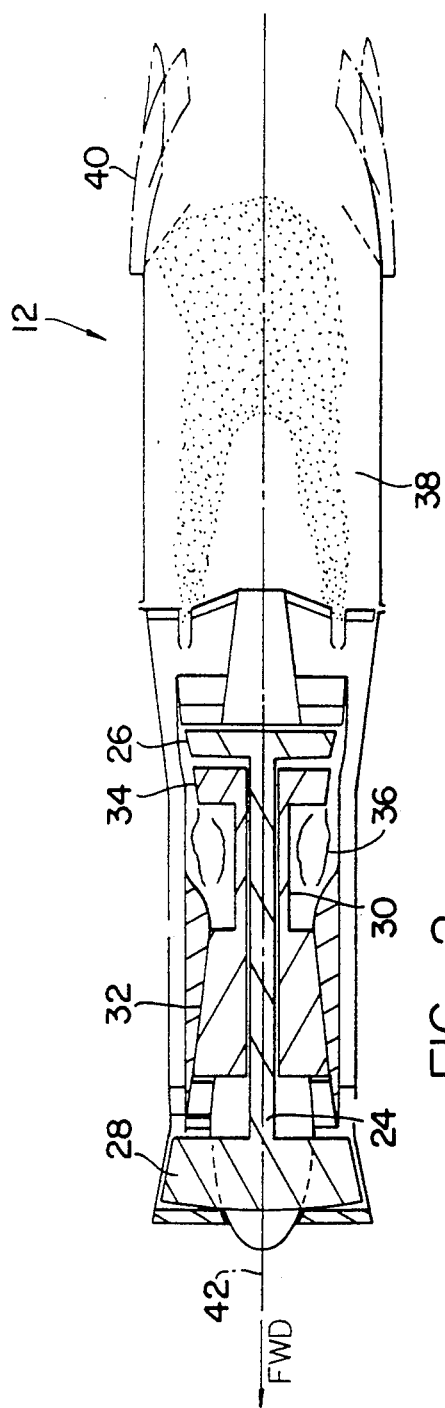
FIG. 2
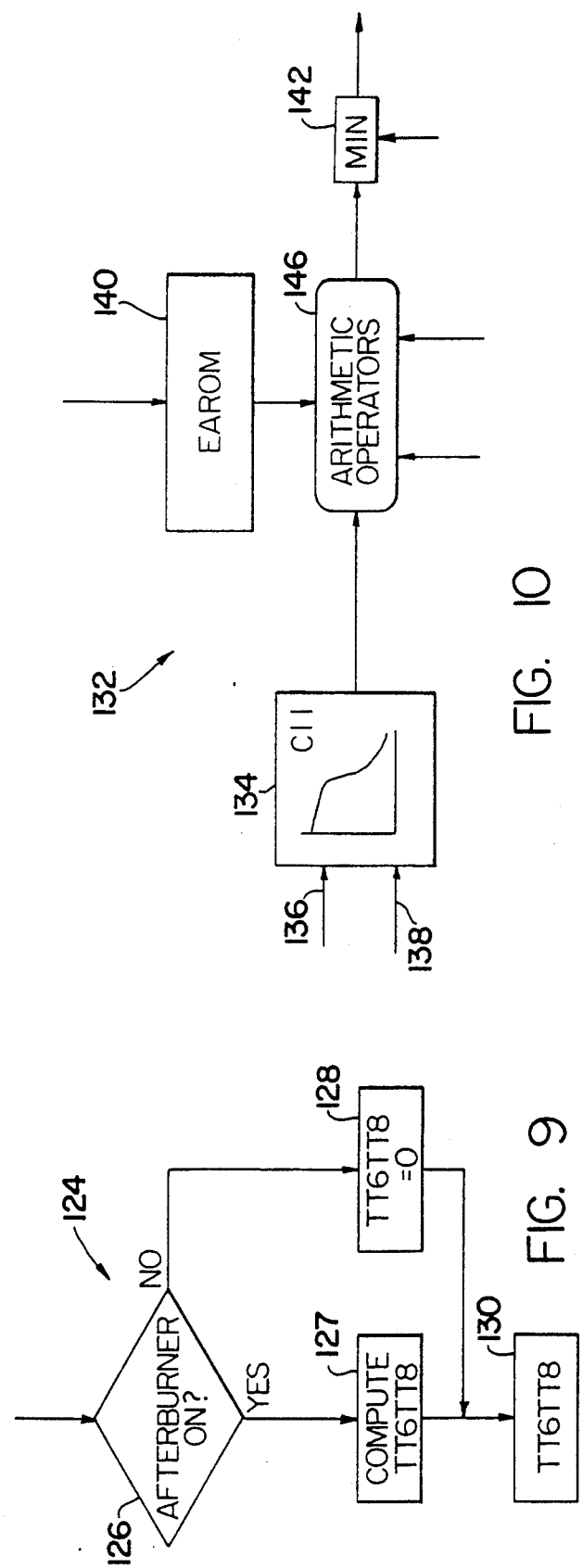
FIG. 9
FIG. 10

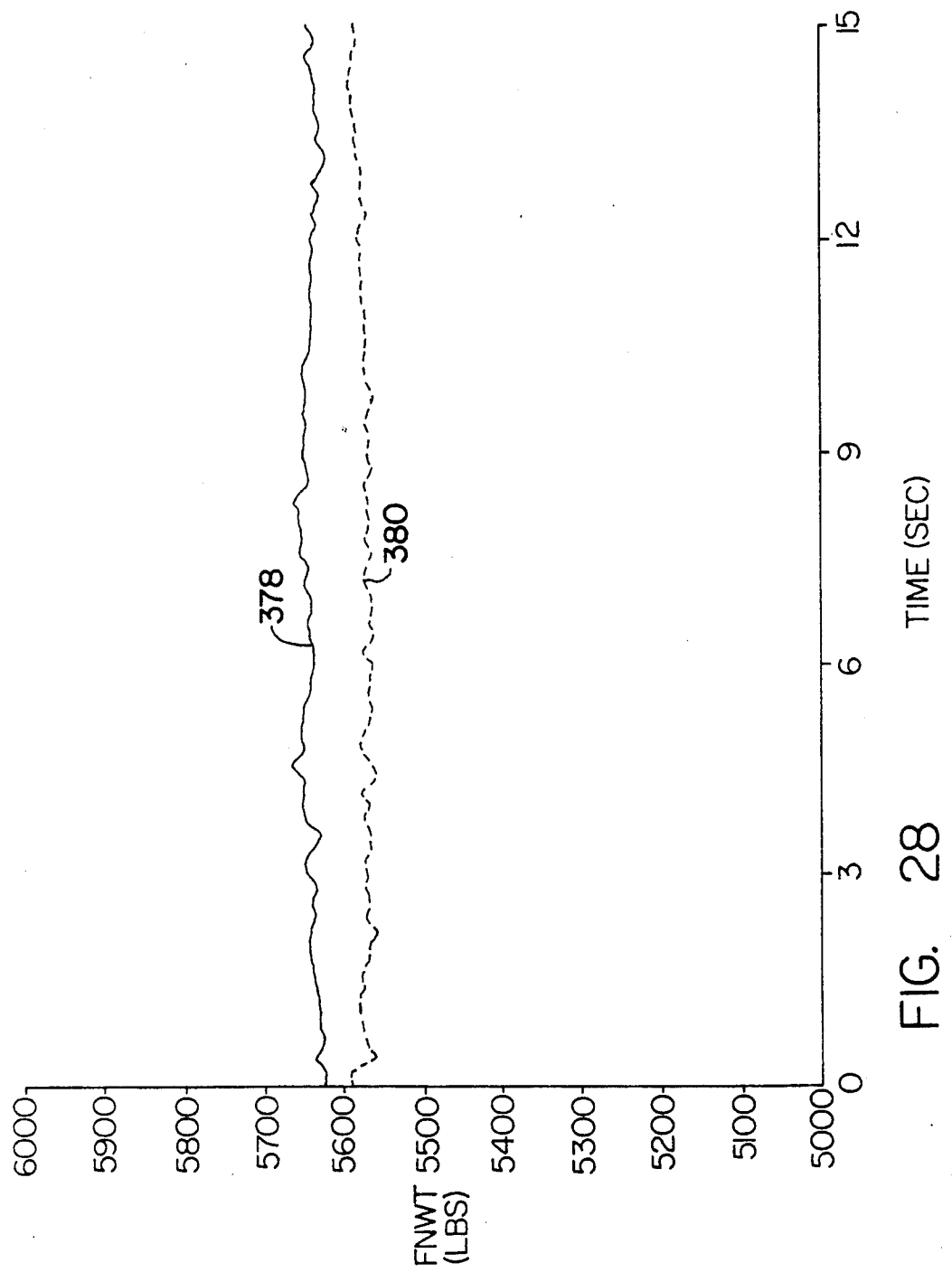

CONTROL SYSTEM FOR GAS TURBINE ENGINES PROVIDING EXTENDED ENGINE LIFE

The Government has rights in this invention pursuant to Contract No. NAS2-11485 awarded by the National Aeronautics and Space Administration.

TECHNICAL FIELD

This invention relates to gas turbine aircraft engines, more particularly to control systems therefor which operate an engine at reduced turbine inlet temperature for a selected value of thrust.

BACKGROUND OF THE INVENTION

Gas turbine control systems are well known in the art. These control systems are specially configured for use with particular civilian or military aircraft application For example, a fighter aircraft must be capable of undergoing violent maneuvers which require changes in engine thrust to severely accelerate or decelerate the aircraft. The fact that the aircraft must be able to perform severe maneuvers dictates the configuration of the engine control system.

An example of an engine used in fighter aircraft is the F100 engine manufactured by Pratt and Whitney Aircraft, a division of The United Technologies Corporation, the assignee of the present application. The F100 engine is a multiple spool, axial flow turbine power plant having a mixed flow, afterburning turbo fan engine configuration. The engine is characterized by a fan or low compressor coaxial with a high compressor rotor. Both the fan and high compressor have vanes whose angles are adjustable while the rotor blades are moving. The engine also has a variable area exhaust nozzle and an afterburner.

As is well known, gas turbine jet engines are most efficiently operated at high values of engine pressure ratio (EPR) as a function of airflow (W), which values can be raised by reducing the exhaust nozzle cross-sectional area. However, too high an engine pressure ratio for a given rate of airflow will produce engine stall. An engine stall condition occurs for every value of airflow for a given engine pressure ratio and therefore defines a stall region bounded by a stall line in a graph of engine pressure ratio versus engine airflow. The allowable engine pressure ratios for a given airflow defines an operational line displaced away from the stall line. Engine control systems for aircraft designed to have these extreme performance characteristics must be specially configured to ensure that the engine can never reach a stall condition, irrespective of the aircraft's current maneuver or the operation of the engine's afterburner.

Consequently, the operating line (i.e. the selected values of engine pressure ratio (EPR) as a function of airflow) is deliberately depressed to avoid the engine stall region. The depressed operating line also corresponds to a regime of lower engine performance and is therefore undesirable. The more maneuverable the aircraft, the more margin there must be in the operating line for the aircraft to unequivocally avoid the stall region, since the stall line can be effected by the in-flight maneuvers of the aircraft. The increased stall margin required by high performance aircraft further lowers the operating line and hence the efficiency at which the control system operates the engine. Not only is the engine efficiency reduced but operating at the depressed operating line results in higher turbine temperatures and correspondingly reduced engine life.

This stall margin must be programmed into the control system even though the aircraft will spend relatively little time operating at the outer reaches of the aircraft's performance envelope. In the past, especially with the HIDEC (Highly Integrated Digital Electronic Control) program, there have been efforts to create engine control systems which would allow the aircraft to work at a higher operating line when the aircraft is, for example, at sub-sonic speeds and flying straight and level. This would enable the engine to operate more efficiently. The HIDEC control system simply adjusted the engine pressure ratio (EPR) upwards in value when the pilot manually indicated to the control that the aircraft was engaged in straightforward non-violent maneuver. However, simply raising the engine pressure ratio significantly raises the turbine inlet temperature and decreases engine life.

It would be advantageous to have control system for a gas turbine engine which can selectively program the engine to operate with reduced stall margin at a selected value of thrust, yielding higher efficiency and longer engine life. The present control system is drawn towards such an invention.

SUMMARY OF THE INVENTION

An object of the present invention is to provide a control system for a gas turbine engine which selectively schedules engine pressure ratio as a function of total engine air flow such that engine thrust remains at a constant selected value for each specific aircraft flight condition.

Another object of the present invention is to provide a control system of the foregoing type which generates the selected value of thrust at reduced engine turbine inlet temperatures, thereby extending engine life.

According to the present invention, an apparatus for controlling thrust from an engine in an aircraft, the engine having a compressor affixed to a spool driven by a turbine, a burner for generating hot exhaust gas and a variable area exhaust nozzle, the engine and aircraft having a plurality of sensors for generating signals indicative of parameters, including altitude and air temperatures and pressures external to and internal to the engine at selected locations thereof, the apparatus including a mechanism for receiving the aircraft and engine parameter signals as well as command signals, including signals requesting normal or extended engine life mode of engine operation. A scheduling mechanism responsive to the aircraft parameter signals is provided for generating signals corresponding to a normal engine operational mode comprised of selected values of engine pressure ratio (EPR) as a function of total engine airflow (W) that comprise a standard operating line. Further, the scheduling mechanism selectively generates signals corresponding to an extended engine life (EEL) operational mode wherein the scheduling mechanism computes a total differential of the engine pressure ratio (EPR) with respect to total airflow such that a ratio therebetween constitutes a value (M) defining a relationship between engine pressure ratio (EPR) and total airflow corresponding to a value of constant engine thrust. The scheduling mechanism selects values of engine pressure ratio (EPR) as a function of total engine airflow (W) in accordance therewith that comprise an extended engine life (EEL) operating line. Also included is a control mechanism responsive to said pilot command signals for providing signals to the scheduling mechanism to select between the normal and extended engine life (EEL) operating modes.

BRIEF DESCRIPTION OF THE DRAWINGS

FIG. 2 is a simplified sectioned illustration of the gas turbine engine of FIG. 1.

FIG. 2 is a simplified sectioned illustration of the gas turbine engine of FIG. 1.

FIG. 9 is a diagrammatic illustration of a third subsection of the thermodynamic signal generator of FIG. 6.

FIG. 10 is a simplified illustration of an airflow scheduling mechanism provided with the controller of FIG. 1.

FIG. 28 is a diagrammatic illustration showing the effect of the control system of FIG. 1 on engine thrust as a function of time, as measured in a flight test.

DESCRIPTION OF THE PREFERRED EMBODIMENT

Figure 1:
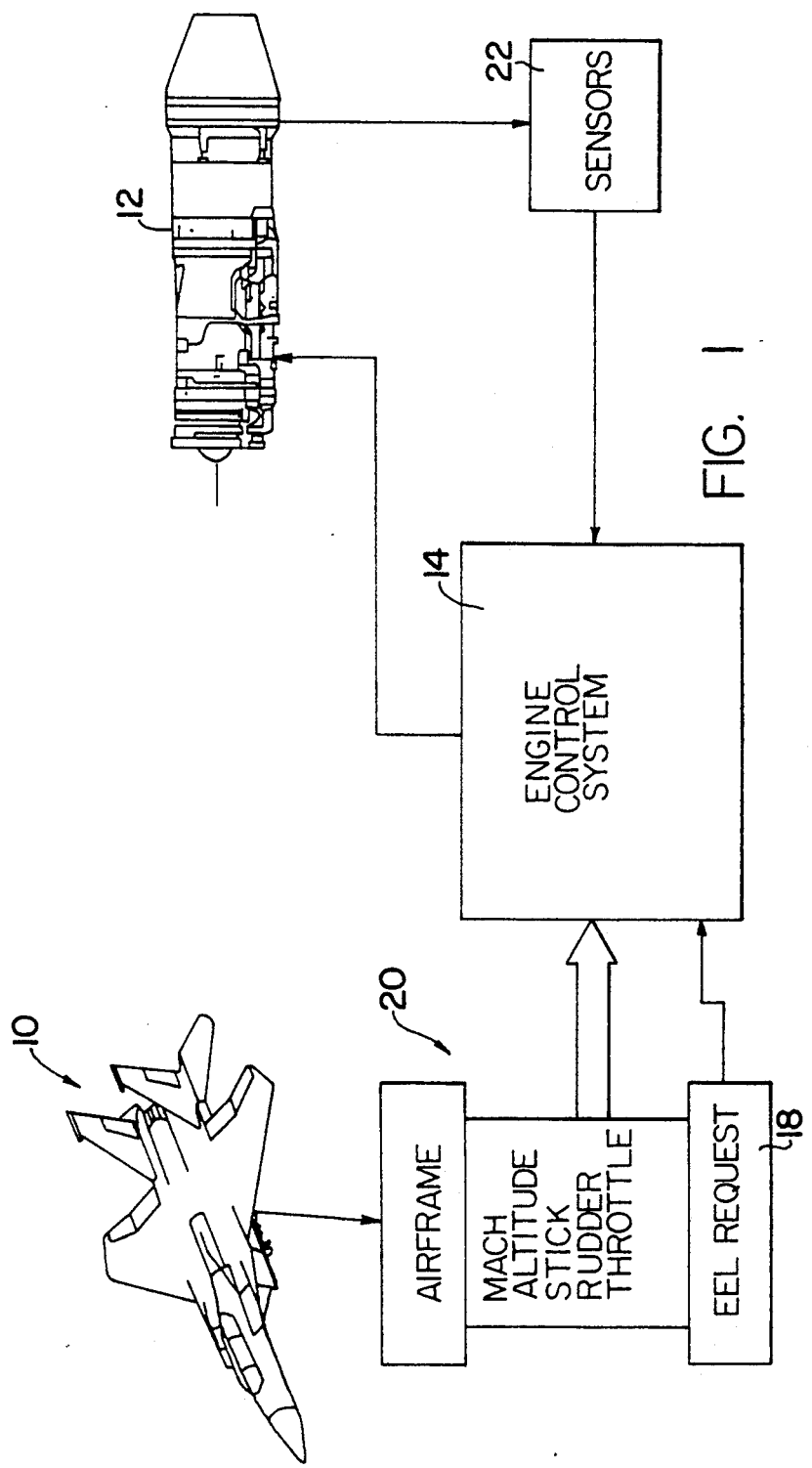
FIG. 1 is a simplified illustration showing a gas turbine engine in a jet aircraft operated by a control system provided according to the present invention.

As seen in FIG. 1, a jet aircraft 10 includes at least one engine 12. The jet engine is operated by means of an electric engine control system 14 which, upon pilot request shown generally at 18, operates the engine in an extended engine life (EEL) mode where engine life is enhanced without sacrificing performance. The engine control system receives, at 20, signals from the aircraft indicative of several aircraft parameters such as aircraft speed (Mach number), altitude and pilot inputs (stick, rudder, throttle). The engine control system also receives feedback signals from a plurality of sensors within the engine, as schematically illustrated at 22.

The control system in the preferred embodiment is comprised of sufficient conventional computer hardware and software to perform the functions enumerated herein. Although preferably digital, those skilled in the art will note that a control system provided according to the present invention can alternatively be embodied in analog electronic, hydraulic or mechanical means with appropriate changes in hardware and software.

The engine 12, as shown in a simplified section in FIG. 2, has an N1 spool 24 including a fan drive turbine 26 driving a fan 28 and an N2 spool 30 having a high pressure compressor 32 and high pressure turbine 34. The high pressure compressor and high pressure turbine are sometimes referred to as the gas generator or engine core. A conventional burner 36, disposed between the compressor exit and turbine inlet serves to heat and accelerate the engines working medium in order to energize the gas sufficiently to power the turbines and generate thrust. The high pressure spool and low pressure spool are not mechanically connected to each other but rotate independently. The engine also includes an augmenter or afterburner 38 receiving discharged gas from the low turbine and fan OD exit. The gas exits the engine via an exhaust nozzle 40. As is conventional, an actuator (not shown) is used to control the position of the exhaust nozzle and thereby vary the area (AJ) of the exhaust discharge opening. As is conventional there are several engine parameter measurement positions along longitudinal axis 42, from position "0" corresponding to the ambient air external to the engine intake to position "8" at the exhaust nozzle exit. These engine positions as well as terms used herein and conventional notation are defined in the following Glossary.

| | |
|---|---|
| ADJ51 | FTIT EAROM (DEG. F) FOR AIRFLOW ADJUSTMENT |
| AJ | NOZZLE THROAT AREA (SQ. FT.) |
| CV | GAS VELOCITY COEFFICIENT AT EXHAUST NOZZLE |
| CVEPR | PART. DER. CV W/R TO EPR |
| DEPRHD | DEEC INPUT - % DELTA ENGINE PRES. RATIO |
| DPOPAB | % AFTERBURNER LOSS, (PT6M-PT7)/PT6M |
| DPPWFN | PART DER. OF AFTERBURNER PRESS. LOSS W/R TO AIRFLOW |
| DWACHD | DEEC INPUT - DELTA CORRECTED AIRFLOW |
| DWACNN | DEEC FTIT EAROM DELTA AIRFLOW |
| DWTRM | DEEC TRANSIENT DELTA AIRFLOW |
| e | EXHAUST NOZZEL EXIT |
| EEL | EXTENDED ENGINE LIFE MODE |
| EMGOAL | UPMATCHED EPR SCHEDULE SLOPE |
| EPR | SENSED ENGINE PRESSURE RATIO |
| EPRB | BASE ENGINE PRESSURE RATIO |
| EPRD | FINAL EPR |
| EPRL | SENSED ENGINE PRESSURE RATIO (PT6M/PT2) |
| EPRR | REQUESTED ENGINE PRESSURE RATIO |
| ETARAM | RAM RECOVERY (PT2/PT1) |
| ETRWFN | PART. DER. OF ETARAM W/R TO WFAN |
| FAAB | AFTERBURNER FUEL AIR RATIO |
| FNCV | PART. DER. OF NET THRUST W/R TO CV |
| FNDPP | PART. DER. OF NET THRUST W/R TO DPOPAB |
| FNEPR | PART. DER. OF NET THRUST W/R TO EPR |
| FNETRM | PART. DER. OF NET THRUST W/R TO ETARAM |
| $F_N$ | NET THRUST - LBS |
| $F_G$ | GROSS THRUST - LBS |
| FNTT6 | PART. DER. OF NET THRUST W/R TO TT6M |
| FNWFAN | PART. DER. OF NET THRUST W/R TO WFAN |
| FTIT | FAN TURBINE INLET TEMPERATURE |
| g | GRAVITATIONAL CONSTANT (FT/S/S) |
| GAMMA1 | RATIO OF SPECIFIC HEATS FOR AIR AT T=TS1 |
| GAMMA8 | RATIO OF SPEC. HEATS FOR VITIATED AIR AT T=TS8 |
| HDDEPR | HIDEC DELTA ENGINE PRESSURE RATIO REQUEST |
| HDDWAC | HIDEC DELTA FAN CORRECTED FLOW REQUEST |
| m | MASS FLOW |
| M | CONSTANT THRUST SLOPE |
| MACH | AIRCRAFT MACH NUMBER |
| N1 | LOW COMPRESSOR ROTOR SPEED |
| N1C2 | LOW ROTOR CORRECTED SPEED (RPM) |
| N1C2B | BASE LOW ROTOR SPEED |
| N1C2D | FINAL ROTOR CORRECTED SPEED |
| N1C2R | REQUESTED LOW ROTOR SPEED |
| N2 | HIGH COMPRESSOR ROTOR SPEED |
| NPR | SYNTHESIZED EXHAUST NOZ. PRES. RATIO |
| o | AMBIENT |
| $\Delta P_{AUG}/P$ | AFTERBURNER PRESSURE LOSS |
| PB | BURNER PRESSURE |
| PCTEPR | EPR UPMATCH REQ. (UPMATCHED TO NOM) |
| PLA | POWER LEVER ANGLE |
| PLAAB | POW. LEVER ANGLE AFTER A/B LOCKOUT LOGIC |
| PT2 | ENGINE INLET FACE TOTAL PRESSURE (LB/(SQ. IN)) |
| R | GAS CONSTANT FOR AIR & VITIATED AIR T*LB/LB*R) |
| s | STATIC |
| SYNCV | SYNTHESIZED NOZZLE VELOCITY COEFFICIENT |
| TAMB | FREE STREAM STATIC TEMPERATURE (DEG. F) |
| THETA | TT2/518 |
| TT2 | ENGINE INLET FACE TOTAL TEMPERATURE |
| TT6 | MASS AVERAGE TOTAL GAS TEMP AT STA. 6 |
| TT6EPR | PART. DER. OF TT6M W/R TO EPR AT FN=K |
| TT6WFN | PART. DER. OF TT6M W/R TO WFAN AT FN=K |
| TT6TT8 | AFTERBURNER TEMP RISE |
| TT8EPR | PART. DER. OF T8 TEMP. W/R TO EPR |
| WACC | DEEC FAN TOTAL CORRECTED AIRFLOW (LB/S) |

-continued

| | |
|---|---|
| WACNOM | NOMINAL SCHEDULED CORRECTED AIRFLOW |
| WACSCH | OPERATING SCHEDULED CORRECTED FLOW |
| WASCH | BASE SCHEDULED CORRECTED FLOW |
| WAT2D | FINAL CORRECTED AIRFLOW |
| WAT2B | BASE TOTAL CORRECTED AIRFLOW |
| WBL | TOT. AIRCRAFT ACCES. BLEED FLOW (LB/S) |
| WFAB | TOTAL AUGMENTED FUEL FLOW (LB/S) |
| WFAN | FAN TOTAL PHYSICAL AIRFLOW (LB/S) |
| WFPRI | PRIMARY COMBUSTOR FUEL FLOW (LB/HR) |

Engine Measurement Stations

| | | | |
|---|---|---|---|
| 1 | aircraft inlet | 2 | engine inlet |
| 2.4 | fan discharge | 2.5 | rear compressor inlet |
| 3 | rear compressor exit | 4 | combustor exit |
| 4.5 | fan turbine inlet | 5 | fan turbine exit |
| 6 | afterburner inlet | 7 | afterburner exhaust |
| 8 | exhaust nozzle exit | | |

As shown in FIG. 1, the control system receives signals from various components and sensors in the aircraft which monitor aircraft parameters such as airspeed and altitude. Signals indicative of the angle of a throttle lever as well as the rate of change of throttle lever angle are provided to the control system. These signals are used by the control system to generate command signals to control burner fuel flow and the area of the exhaust nozzle in accordance with predetermined schedules selected to achieve optimum engine operation over the aircraft's flight envelope. Both the fan and high compressor have a plurality of vanes whose position are adjustable from partially closed to fully open. As is well known, these variable vanes are also adjusted according to pre-programmed schedules which will optimize the power and response of the engine. Parameter sensors, digital-to-analog and analog-to-digital converters and conventional computer means which may be required are not illustrated in the drawing for the sake of clarity. The preferred control system also comprises a plurality of function generators or schedules that have been diagrammatically shown with unlabeled axes.

Figure 3:
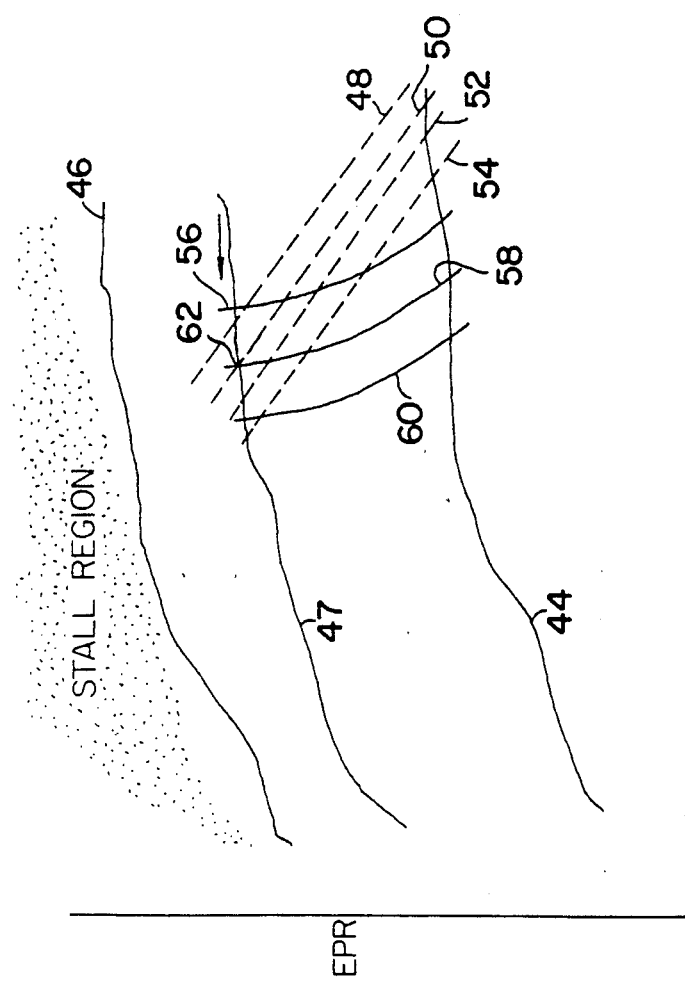
FIG. 3 is a diagram showing the relationship between engine pressure ratio and airflow for the engine of FIG. 2.

Referring now to FIG. 3, there is illustrated a diagram showing the relationship between engine pressure ratio (EPR) and airflow. Known gas turbine engine control systems are configured to operate the engine at a selected value of engine pressure ratio as a function of the total airflow through the engine at a given total inlet pressure. This generates an operating line, such as the operating line 44 in FIG. 3. Stored with the control system are a family of such operating lines, one for each total inlet pressure.

As detailed hereinabove, excessive values of engine pressure ratio for a given airflow will result in the engine stalling. Hence, the engine cannot be operated above a stall line 46 bounding the stall region. It is necessary for jet engine control systems to further depress the operating line away from the stall line to ensure that the engine will not enter the stall region regardless of the aircraft's ambient conditions or maneuvers. However, engine operation at this depressed operating line 44 results in low engine efficiencies. Operating line 47 provides more efficient operation but can only be used when the flight conditions are well within the aircraft's flight envelope.

Certain engine controllers have successfully sought to increase engine thrust by increasing the engine pressure ratio for a given function of airflow. However, a simple increase in the value of engine pressure ratio associated with the particular value of airflow results in higher operating temperatures and hence shortened engine life. However with the control system provided according to the present invention, engine airflow and engine pressure ratio are selectively reconfigured to provide a constant value of thrust at higher operating efficiencies and at a lower engine turbine temperatures. Consequently, the present control system defines an operating line along which the engine can be operated when flight conditions permit. This results in higher engine efficiencies at lower engine turbine temperatures yielding greater fuel economy and longer engine life.

Curves 48, 50, 52 and 54 correspond to curves of constant engine thrust while curves 56, 58 and 60 correspond to values of constant turbine inlet temperature (FTIT), with curve 60 being the lowest value of FTIT and curve 54 being the lowest value of thrust. The present control system determines the thrust that the engine is providing and alters the value of engine pressure ratio and airflow to new values thereof to provide that value of thrust. For example, in response to a command signal for extended engine life (EEL) operation, the present control system determines the current thrust line (line 50) and, in a manner detailed hereinafter, computes a new value of engine pressure ratio and airflow corresponding to point 62 on line 50 that coincides with operating line 47. Note that the value of engine thrust remains constant and that the value of fan inlet turbine temperature has been reduced from a higher to a lower value.

The control system of the present invention operates under the assumption that the relationship between engine pressure ratio (EPR) and airflow along a line of constant net thrust can be linearly approximated such that $$-\Delta WA = (M) \Delta EPR \qquad (1)$$

upon determining the value of M, the slope of the line of constant thrust, the value of reduced airflow is found from a given value of $\Delta$ EPR. The relationship between thrust, airflow, and engine pressure ratio can be written as $$F_n = C_t(W_{fan} - W_{fuel} - W_{bld})\sqrt{\frac{2\gamma_8 R_g}{(\gamma_8 - 1)g}} \qquad (2)$$

$$\sqrt{1 - \frac{1}{\left[\eta_{ram} EPR \left(1 + \frac{\gamma_1 - 1}{2} M_{AC}^2\right)^{\frac{\gamma_1}{\gamma_1 - 1}} \left(1 - \frac{\Delta P}{P_{avg}}\right)\right]^{\frac{\gamma_8 - 1}{\gamma_8}}}} - W_{fan} M_{ac} \sqrt{\frac{\gamma_1 R T_{amb}}{g}}$$

where $W_{fan}$ corresponds to airflow from the rotating fan, $W_{fuel}$ corresponds to the flow of fuel and $W_{bleed}$ corresponds to the flow which does not pass the exhaust of the engine. The other symbols in the equation are defined hereinabove with respect to the Glossary. Note that the numerical subscripts 6 or 8 correspond to that parameter as measured at position 6 or 8, respectively, in the engine. Certain terms (TT8 − TT6) reduce to zero if an afterburner is not present or not operational.

The resulting net thrust is given by:

$$F_n = F_g - W_{FAN} M_{AC} \sqrt{\frac{\gamma_1 R T_{amb}}{g}} \tag{3}$$

For determining constant thrust the total derivative of the generalized thrust equation is set equal to zero.

$$DF_n = \left(\frac{\delta F_n}{\delta W_{fan}} \Delta W_{fan}\right) + \left(\frac{\delta F_n}{\delta T_g} \Delta T_g\right) + \tag{4}$$

$$\left(\frac{\delta F_n}{\delta EPR} \Delta EPR\right) + \left(\frac{\delta F_n}{\delta \eta_{ram}} \Delta \eta_{ram}\right) + \left(\frac{\delta F_n}{\delta C_v} \Delta C_v\right) +$$

$$\left(\frac{\delta F_n}{\delta \frac{\Delta P_{avg}}{P}} \Delta \frac{\Delta P_{avg}}{P}\right) = 0$$

Expressing the deltas in terms of either airflow (WA) or engine pressure ratio (EPR) yields:

$$\frac{\delta F_n}{\delta W_{fan}} \Delta W_{fan} + \frac{\delta F_n}{\delta EPR} \Delta EPR + \tag{5}$$

$$\frac{\delta F_n}{\delta T_g} \frac{\delta T_g}{\delta EPR} \Delta EPR + \frac{\delta F_n}{\eta_{ram}} \frac{\delta \eta_{ram}}{\delta W_{fan}} \Delta W_{fan} +$$

$$\frac{F_n}{\delta C_v} \frac{C_v}{\delta EPR} \Delta EPR + \frac{\delta F_n}{\delta \frac{\Delta P_{avg}}{P}} \partial \frac{\frac{\Delta P_{avg}}{P}}{\delta W_{fan}} \Delta W_{fan} = 0$$

solving for $\Delta W$ airflow yields:

$$-\Delta W_{fan} = \tag{6}$$

$$\left[\frac{\frac{\delta F_n}{\delta EPR} + \frac{\delta F_n}{\delta T_g} \frac{\delta T_g}{\delta EPR} + \frac{\delta F_n}{\delta C_v} \frac{\delta C_v}{\delta EPR}}{\frac{\delta F_n}{\delta W_{fan}} + \frac{\delta F_n}{\delta \eta_{ram}} \frac{\delta \eta_{ram}}{\delta W_{fan}} + \frac{\delta F_n}{\delta \frac{\Delta P_{avg}}{P}} \frac{\partial \frac{\Delta P_{avg}}{P}}{\delta W_{fan}}}\right] \Delta EPR$$

where the bracketed term corresponds to the constant thrust slope M. In order to evaluate the expression, the individual terms must be solved explicitly, with many of the terms being solvable directly from the generalized thrust equation. Algorithms executed by the control system to calculate these terms are detailed hereinafter with respect to the several figures. These terms are presented in equations 7-11 as follows:

$$\frac{\delta F_n}{\delta EPR} = \frac{K_{11} K_{12} K_{14}}{2 (EPR \cdot K_{12})^{(K_{14}+1)} \sqrt{1 - \frac{1}{(EPR \cdot K_{12})^{K_{14}}}}} \tag{7}$$

$$\frac{\delta F_n}{\delta T_8} = K_{21} \left(\frac{1}{2}\right) (T_{T8})^{\frac{-1}{2}} - \frac{K_{21}}{2 \sqrt{T_{T8}}} \tag{8}$$

$$\frac{\delta F_N}{\delta R_{RAM}} = \frac{K_{11} K_{31} K_{14}}{2 (\eta_{RAM} \cdot K_{31})^{K_{14}+1} \sqrt{1 - \frac{1}{(\eta_{RAM} \cdot K_{31})^{K_{14}}}}} \tag{9}$$

$$\frac{\delta F_N}{\delta W_{FAN}} = K_{42} - K_{43} \tag{10}$$

$$\frac{\delta F_N}{\delta C_v} = K_{51} \tag{11}$$

Where $$K_{11} = C_v m_g \sqrt{\frac{\gamma_8 \, 2R}{\gamma_g - 1}} \sqrt{T_{T8}} \tag{12}$$

$$K_{12} = \eta_{RAM} \left[1 + \frac{\gamma_o - 1}{2} + M_o^2\right]^{\frac{\gamma_o}{\gamma_D - 1}} \left[1 - \frac{\Delta P}{P}\bigg|_{avg}\right] \tag{13}$$

$$K_{13} = m_o M_o \sqrt{\gamma_0 R T_{s0}} \tag{14}$$

$$K_{14} = \frac{\gamma_g - 1}{\gamma_g} \tag{15}$$

$$K_{21} = C_v m_g \sqrt{\frac{2\gamma_8 R}{(\gamma_g - 1)g}} \cdot \sqrt{1 - \frac{1}{\left[EPR \cdot \eta_{ram}\left[1 + \frac{\gamma_0 - 1}{2} M_o^2\right]^{\frac{\gamma_0}{\gamma_0 - 1}}\left(1 - \frac{\Delta P}{P_{avg}}\right)\right]^{\frac{\gamma_g - 1}{\gamma_g}}}} \qquad (16)$$

$$K_{31} = EPR\left[1 + \frac{\gamma_0 - 1}{2} M_o^2\right]^{\frac{\gamma_0}{\gamma_0 - 1}}\left(1 - \frac{\Delta P}{P_{avg}}\right) \qquad (17)$$

$$K_{43} = M_o \sqrt{\gamma_0 R T_{s0}} \qquad (18)$$

$$K_{51} = m_g \sqrt{\frac{2R\gamma_8}{(\gamma_g - 1)g}} \sqrt{T_{T8}} \cdot \sqrt{1 - \frac{1}{\left[EPR \cdot \eta_{ram} \cdot \left[1 + \frac{\gamma_0 - 1}{2} M_o^2\right]^{\frac{\gamma_8}{\gamma_8 - 1}}\left(1 - \frac{\Delta P}{P_{avg}}\right)\right]^{\frac{\gamma_g - 1}{\gamma_g}}}} \qquad (19)$$

Figure 4:
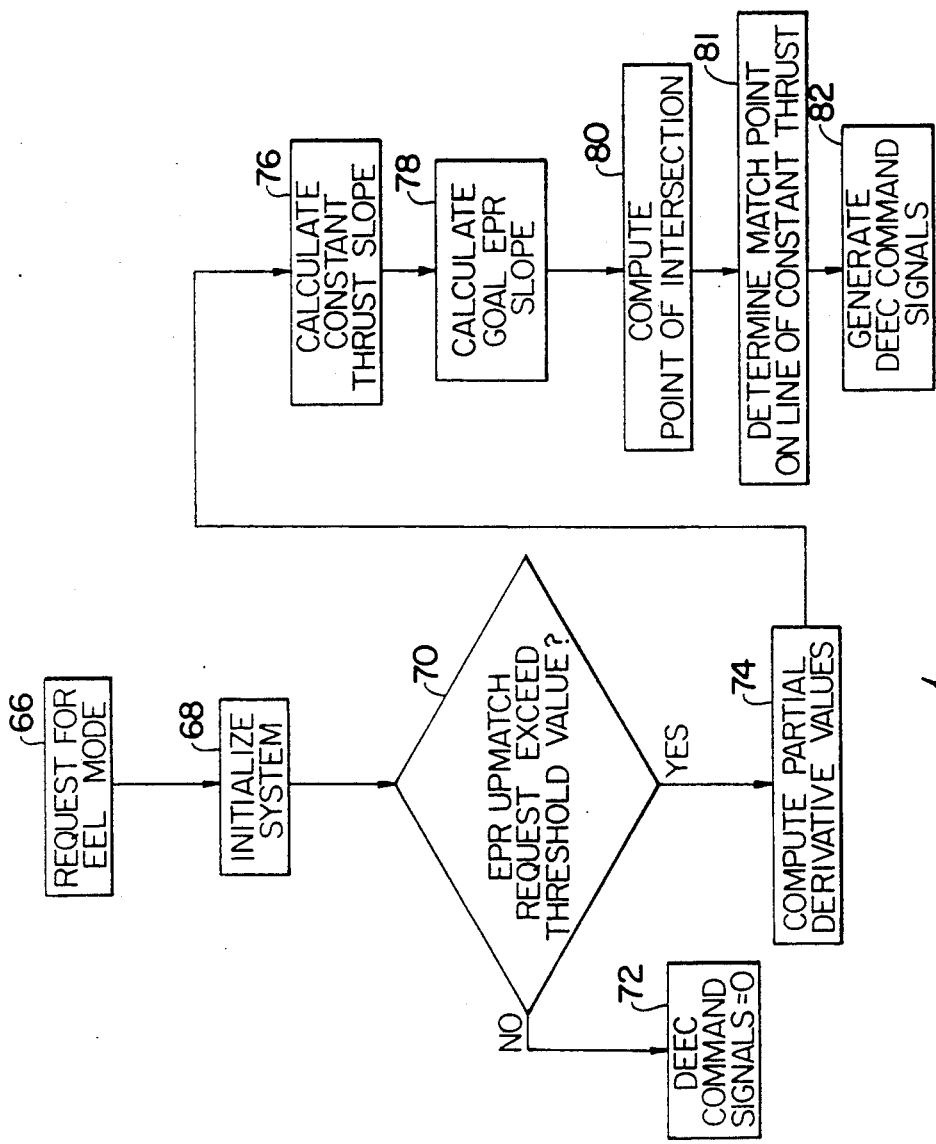
FIG. 4 is a simplified diagrammatic illustration of a control algorithm executed by an electronic engine control portion of the control system of FIG. 1.

A simplified diagrammatic illustration of an algorithm 64 executed by the present control system is shown in FIG. 4. At block 66, the control system receives a request from the pilot for EEL operational mode. The system is initialized (block 68). The control system determines if the EPR upmatch request exceeds a threshold value (block 70). If the requested value is of insufficient magnitude, the electronic control will, at 72, output command signals of zero magnitude, i.e. the control system will resume normal operation along the standard operating line.

However, if the EPR upmatch requested value exceeds the threshold value, the system will compute partial derivative values (block 74), calculate the slope of the particular constant thrust line along which the engine is being operated (block 76). The system will calculate a goal engine pressure ratio slope (block 78) and compute the point of intersection between these curves (block 80) and determine the match point on the line of constant thrust (block 81). Finally, the system will, at 82, generate command signals to alter the engine configuration so that the new values of engine pressure ratio and airflow are achieved.

Figure 5:
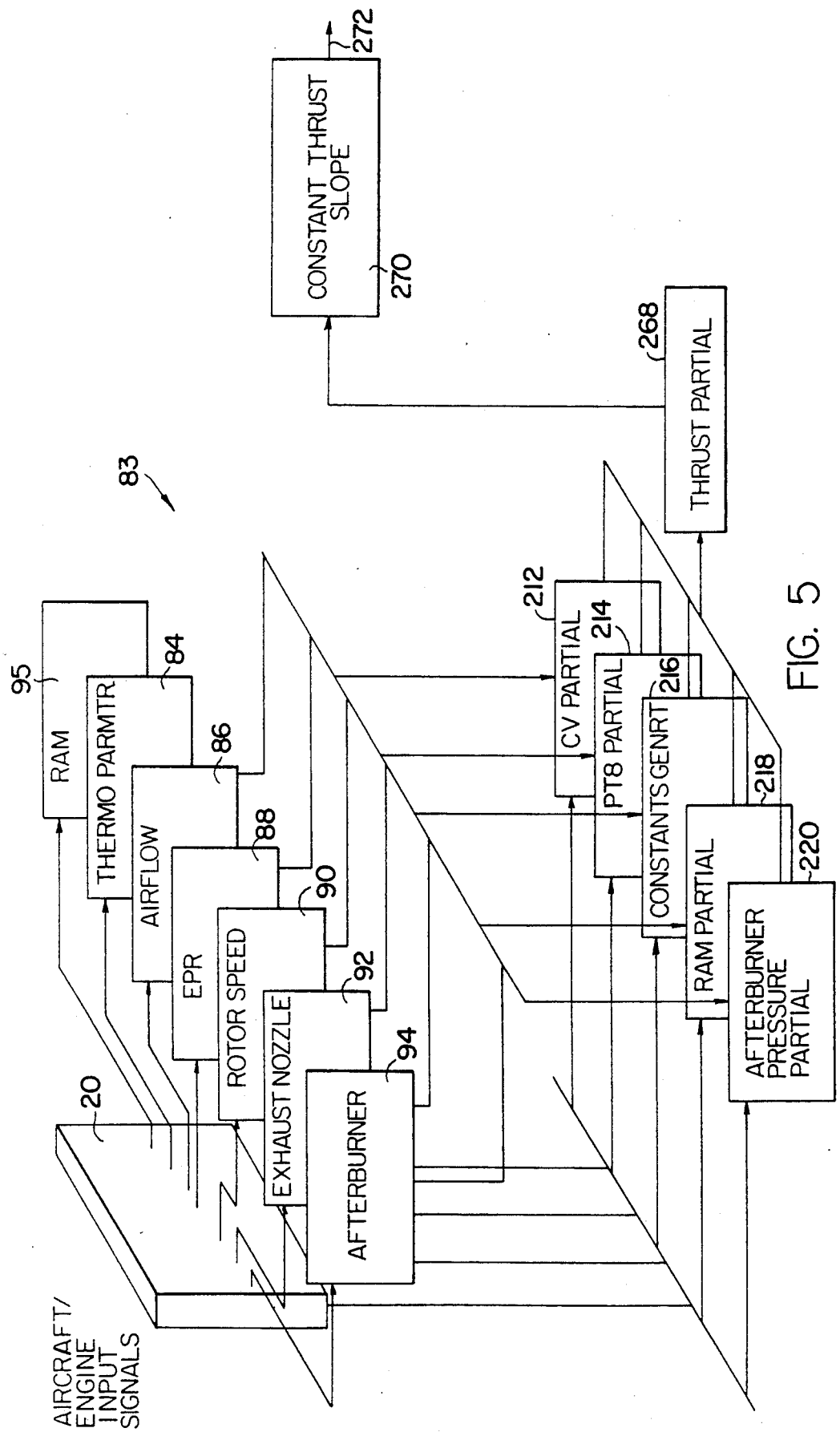
FIG. 5 is a schematic illustration of a section of the engine control system portion of FIG. 4.

Referring now to FIG. 5, there is shown a schematic illustration of a first portion 83 of the electronic engine control system portion of FIG. 1. The control system incorporates a device schematically illustrated at 20 for receiving the aircraft and engine input signals presented thereto. These signals are routed to a plurality of scheduling mechanisms which, as detailed hereinafter, execute respective algorithms for generating signals used in the function of the control systems.

Thermodynamic parameters are generated by mechanism 84. The basic airflow schedule is computed by a mechanism 86 while the basic engine pressure ratio (EPR) is computed by a mechanism 88. Basic rotor speed scheduling mechanism 90 generates the signals indicative of engine rotor speed. Exhaust nozzle generator mechanism 92 provides synthesized signals indicative of several exhaust gas parameters at the exhaust nozzle. Afterburner pressure loss calculation mechanism 94 similarly generates signals indicative of afterburner pressure loss. Signals corresponding to aircraft inlet pressure recovery (RAM) are provided by scheduling mechanism 95. As detailed hereinafter, synthesized signals are presented along with the selected ones of the aircraft engine input signals to corresponding scheduling mechanisms needed to compute the partial derivatives used for solving the equation for the slope M of the selected constant thrust line.

Two terms in equation 6 are approximated using exhaust nozzle and inlet characteristics. The first is the partial of CV with respect to EPR (CVEPR). As detailed hereinafter, this term is approximated by differencing a base operating value of CV with one generated using a value of EPR and exhaust nozzle area (AJ) consistent with the higher operating line 47 shown in FIG. 3. The partial of inlet pressure recovery with respect to airflow (ETRWFN) is a function of the airflow and aircraft Mach number and is approximated in a manner similar to the CV partial term described hereinabove.

Two terms in equation 6 are evaluated using engine aero-thermodynamic simulation correlations. The partial of station 8 temperature with respect to EPR is (TT8EPR) found by the control system reading from a table with percent corrected speed. A look-up table having signals corresponding to the percent corrected low rotor speed (PN1C2) is generated by relating small changes in engine pressure ratio with resulting changes in station 8 temperature at constant thrust. At constant thrust, the partial of station 8 temperature with respect to EPR is nonlinear. The partial was simplified by including only the partial evaluated at the optimum EPR schedule. Within the region of interest, the partial is found to be a function of percent corrected low rotor speed (PN1C2) only. The partial of afterburner pressure loss With respect to airflow is (DPPWFN) approximated by twice reading a look-up table having afterburner pressure loss correlation as described hereinabove. Afterburner pressure loss is a function of the flow parameter of the air entering the augmenter or afterburner.

Figure 6:
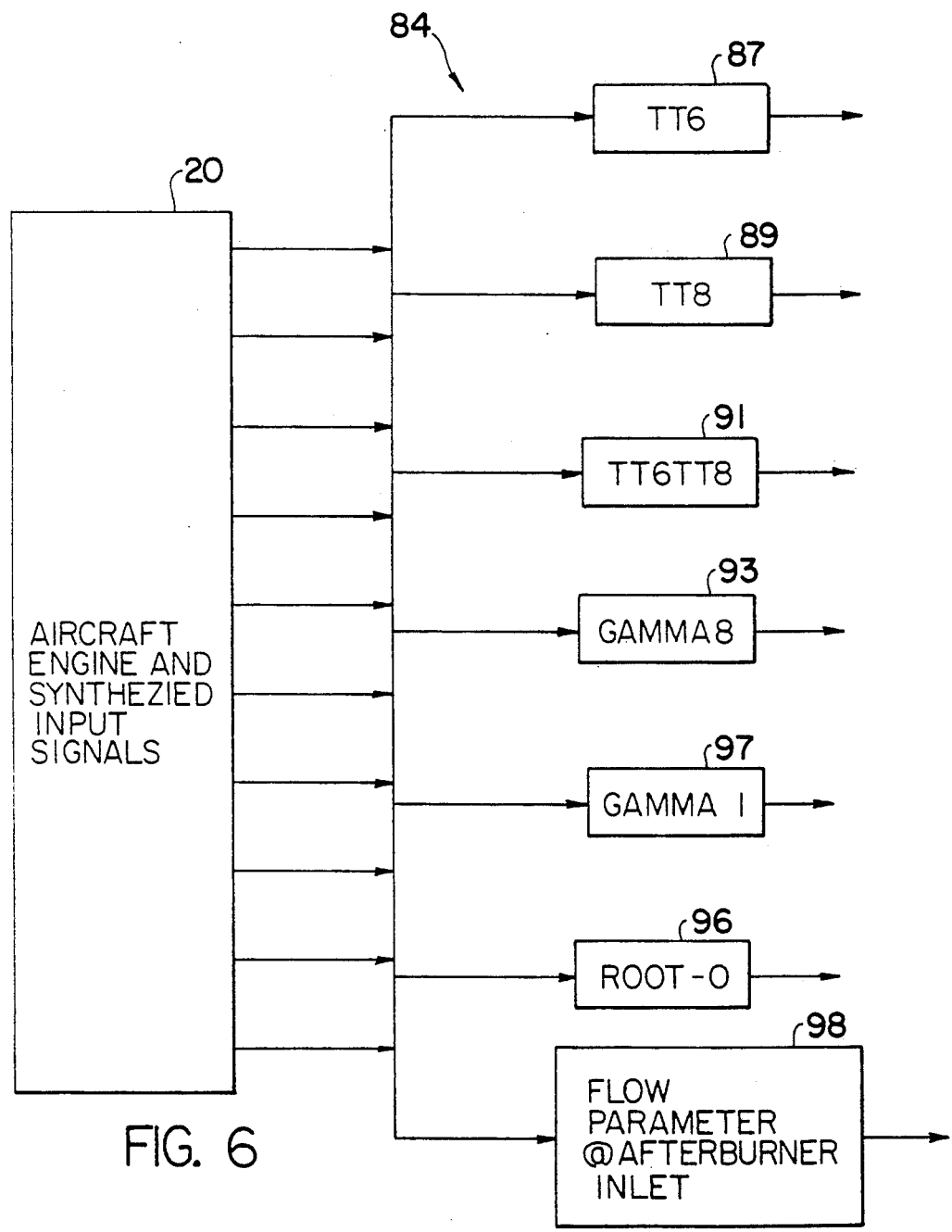
FIG. 6 is a diagrammatic illustration of a thermodynamic scheduling mechanism associated with the engine control system portion of FIG. 4.

Referring now to FIG. 6, there is shown a schematic illustration of the thermodynamic parameter scheduling mechanism 84 of FIG. 5. The scheduling mechanism is comprised of a plurality of schedules including schedule 87 for determining the total temperature at station 6, schedule 89 for determining the total temperature at station 8, schedule 91 for determining the total temperature rise as a result of afterburner operation, schedule 93 for determining the value of gamma at station 8, schedule 97 for determining the value of gamma at station 1 and schedule 96 for determining the value of the square root of theta. Finally, schedule 98 determines the value of the flow parameter at the afterburner inlet. Each of these schedules receive engine, aircraft, and synthesized input signals from a plurality of sensors and devices in the aircraft and engine as illustrated schematically at 20. Each of these scheduling mechanisms generate signals in dependence on algorithms as detailed hereinafter.

Figure 7:
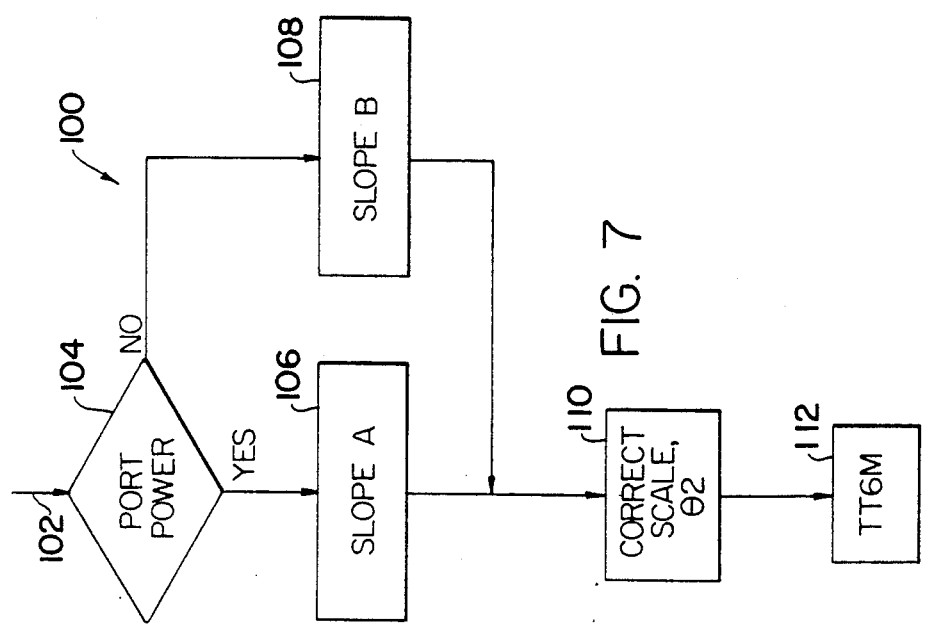
FIG. 7 is a diagrammatic illustration of a first subsection of the thermodynamic signal generator of FIG. 6.

Referring now to FIG. 7, there is shown a diagrammatic illustration of an algorithm 100 executed by the schedule 87 of FIG. 6. The schedule 87 receives at line 102 input signals indicative of the fan turbine inlet temperature (FTIT), the percent low rotor corrected speed (PN1C2), the HIDEC delta engine pressure ratio (HDDEPR), the value of theta 2 (the value of theta at station 2) and the low rotor corrected speed at station 2.0 (NlC2). In response, the scheduling mechanism determines at block 104 whether the engine is operating at part power. This is accomplished by comparing the value of the percent of low rotor corrected speed to see if its magnitude is less than one; indicative of part power operation. If the engine is operating at part power, the schedule will, at block 106, compute a change in fan turbine inlet temperature (FTIT) from a curve stored in look-up table format within the control system. If the engine is operating at full power, the scheduling mechanism will select another curve (block 108). A value of adjusted fan turbine inlet temperature is then established and corrected (block 110). A final value of gas average total gas temperature in degrees Rankine at station 6 is output at block 112.

Figure 8:
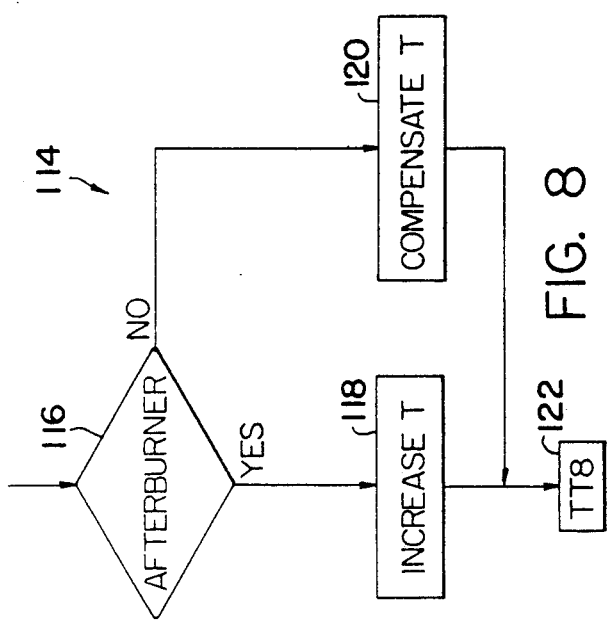
FIG. 8 is a diagrammatic illustration o: a second subsection of the thermodynamic signal generator of FIG. 6.

As diagrammatically shown in FIG. 8, the schedule 88 executes an algorithm 114 that generates a signal indicative of the total temperature at station 8 (TT8). The schedule, at block 116, determines if the afterburner is operational. If the afterburner is not operational (block 120), the total temperature at station 8 is selected to be the total temperature at section 6 times a correction factor that indicates the extent by which the relatively cool stream of air from the fan OD stream is thoroughly mixed with the relatively hot gas from the turbine exit. If the afterburner is on, the associated temperature rise is, at block 120, found from the product of the value of temperature TT6 with a signal indicative of the temperate ratio in the afterburner, as detailed hereinafter. The value thereof is then output at block 122.

The operation of the computing mechanism 91 for determining the temperature rise in the afterburner from afterburner operation is shown in algorithm 124 of FIG. 9. The schedule determines whether the afterburner is on from the value of the throttle lever (PLAAB). If, at block 126, it is greater than a select value (typically a throttle lever angle (PLAAB) greater than 91°, the schedule computes a rise in temperature dependent upon the amount of fuel dumped into the afterburner relative to the amount of air flowing through the afterburner (block 127). If the afterburner is not operational, the schedule sets the value of the temperature ratio associated with the afterburner operation (TT8 over TT6) to be equal to zero (block 128). This value is then output at block 130.

Input signals corresponding to the total temperature at station 2 and the total pressure at station 2, the HIDEC fan corrected airflow and others are used in a known manner by schedule 96 of FIG. 6 to generate signals corresponding to the square root of theta, that is, temperature at station 2 divided by 518° (standard day temperature). Schedule 98 of FIG. 6 which generates signals corresponding to the flow parameter (FP6) does so in a known manner after receiving input signals corresponding to the total temperature at station 6 (TT6M) and signals corresponding to the scheduled engine pressure ratio value (EPRSCH). Other signals, including those corresponding to the total pressure at station 2, DEEC synthesized engine airflow, and known correction factors are similarly used by the schedule 98.

Referring now to FIG. 10, there is shown in simplified diagrammatic form, an algorithm 132 executed by the airflow scheduling mechanism illustrated in FIG. 5. The airflow mechanism 86 (FIG. 5) includes a basic airflow schedule 134 which receives input signals on lines 136 and 138 corresponding to the total temperature at station 2 and the total pressure at station 2. Generated therefrom are signals corresponding to the nominal scheduled corrected airflow (WACNOM). These signals as well as other correction signals are provided at block 140 to arithmetic operators which receive adjustment signals received via external control adjustment mechanism (electronically alterable read on memory, EAROM). Output therefrom are signals corresponding to the airflow request signal. These signals are processed by an arithmetic minimum operator 142 which receives airflow maximum limit scheduling signals (line 144) and outputs a base scheduled engine airflow signal.

Figure 23:
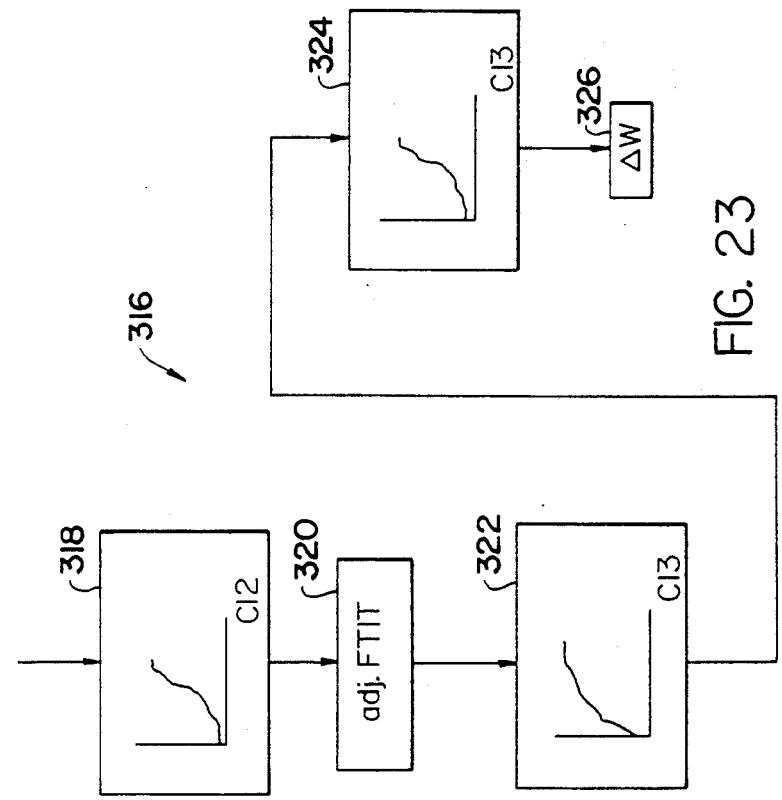
FIG. 23 is a simplified schematic illustration of a second portion of the control system of FIG. 1 which accounts for the change in airflow that is adjustable via an external engine control adjustment.

FIG. 23 illustrates a diagram of a portion of the present control system which controls the programming of an electronically alterable (EAROM) algorithm 316. As is known, each engine can be adjusted by the customer to trim the amount of power that is ultimately obtainable during operation. Signals corresponding to an airflow and total pressure at station 2 are configured by schedule 318 to provide a reference value of the fan turbine inlet temperature (FTIT) corrected to station 2. This value is adjusted by the EAROM at block 320 and an inverse relationship of schedule 318 is established by schedule 322, yielding a schedule for airflow at a given FTIT. These signals are provided to schedule 324 which provides a second value of airflow. These two values are differenced at block 326. As illustrated in FIG. 3, this delta airflow is used to adjust the value of airflow of the base schedule (44), thus trimming the match point.

Figure 12:
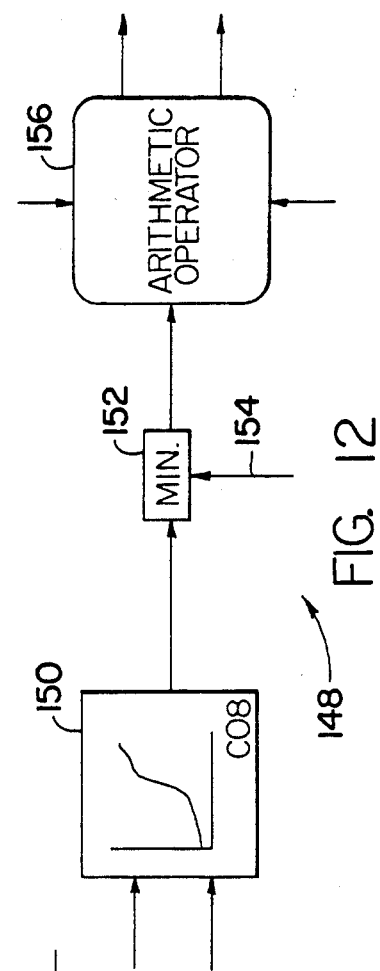
FIG. 12 is a simplified illustration of an engine pressure ratio (EPR) scheduling mechanism provided with the control system of FIG. 1.

FIG. 12 is a simplified diagram of an algorithm 148 executed by the rotor speed scheduling mechanism 90 of FIG. 5. Signals corresponding to the total pressure at station 2 and the scheduled airflow are provided to basic rotor speed schedule 150 Which provides low rotor corrected speed signals. These signals are received by an arithmetic minimum operator 152 which compares the rotor speed signals with rotor speed limit signals presented on line 154. The low rotor corrected speed signal is then provided to arithmetic operator 156 indicative of one or more arithmetic operators which outputs therefrom a plurality of rotor speed signals, including percent low rotor speed signal (PN1C2), low rotor corrected speed, and the base engine control requested rotor speed.

Figure 11:
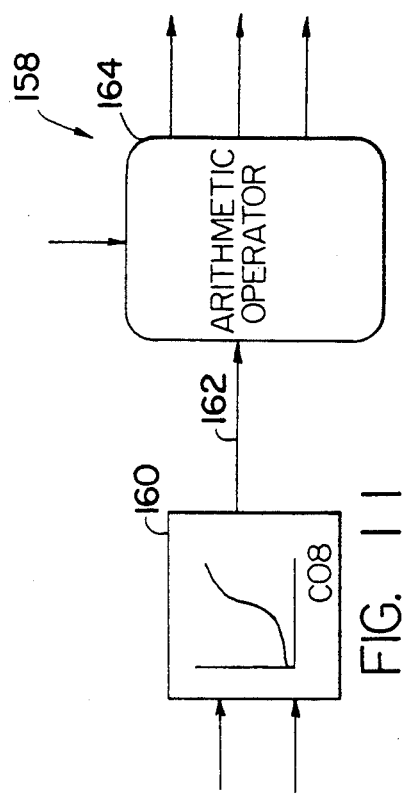
FIG. 11 is a simplified illustration of a rotor speed scheduling mechanism provided with the controller of FIG. 1.

FIG. 11 is a simplified diagram illustrating an algorithm 158 executed by the EPR scheduling mechanism 88 of FIG. 5. A basic EPR schedule 160 receives total pressure at station 2 signals as well as signals indicative of the base corrected low rotor speed and provides therefrom on lines 162 signals corresponding the base scheduled value of engine pressure ratio (EPRSCH). This signal is presented to a plurality of arithmetic operators indicated schematically at 164 which outputs therefrom an EPR schedule signal and a delta EPR signal generated from the comparison of the scheduled EPR signal with the sensed engine pressure ratio signal produced by dividing sensed total pressure at station 6 divided by the total pressure at station 2.

Figure 13:
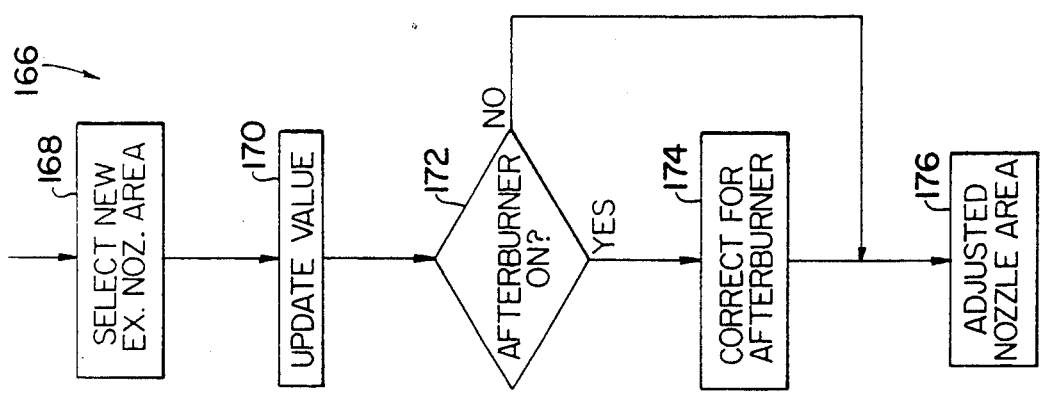
FIG. 13 is a simplified diagram of an algorithm executed by the control system portion of FIG. 4 for controlling exhaust nozzle area.

The calculating mechanism 92 of FIG. 5 comprises two separate schedules associated with exhaust nozzle area. Referring now to FIG. 13 there is diagrammatically shown an algorithm 166 executed by an exhaust nozzle area calculation 92 of FIG. 5 of the present control system. An adjusted value of exhaust nozzle area is determined at block 168 in accordance with received signals Which include the existing value of the exhaust nozzle area, the power level angle, afterburner temperature ratios (TT8/TT6), the speed of the aircraft, and the commanded change in the engine pressure ratio schedule. The selected area is updated at block 170. The schedule determines if the afterburner is in operation (block 172) and if so provides a correction factor (block 174). In addition, the schedule will determine whether or not the power level angle exceeds a certain maximum value in which case the exhaust nozzle area will be selected to be at maximum value. Essentially, the schedule determines how much smaller the commanded exhaust nozzle area is compared to the reference exhaust nozzle area as the present control system performs the upmatch from the standard scheduled operating line. Signals indicative of the adjusted exhaust nozzle area are presented at block 176.

Figure 14:
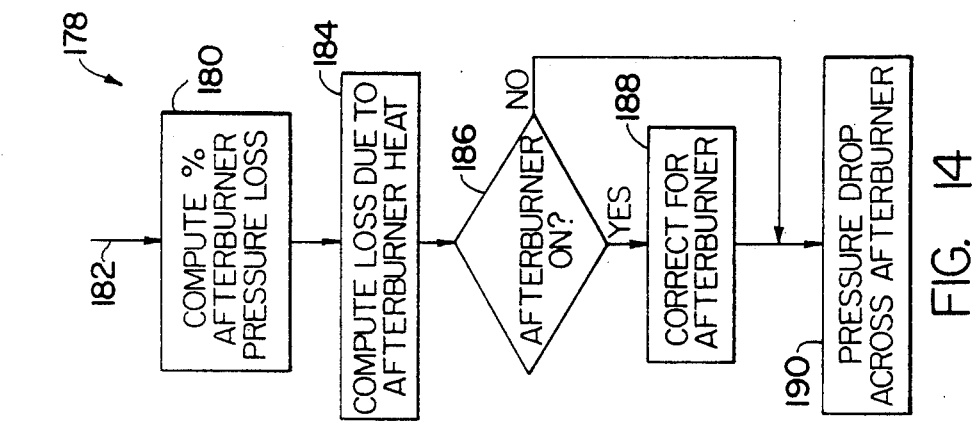
FIG. 14 is a simplified diagram of an algorithm executed by the control system portion of FIG. 4 for compensating for pressure drop across an engine afterburner.

The algorithm 178 detailed in FIG. 14 determines the pressure drop across the afterburner expressed in terms of percent of afterburner inlet pressure The calculating mechanism receives input signals including those corresponding with the afterburner inlet flow parameter, the power level angle and the T6-T8 temperature ratio on line 182. A non-afterburning percent afterburner pressure loss is computed at block 180. The pressure loss due to the afterburner heat (Rayleiqh) is computed at block 184. The operational status of the afterburner is determined at block 186, with a correction for afterburner operation and partial afterburner operation if appropriate, being provided at block 188 before a signal indicative of the total pressure drop across the afterburner is provided at block 190.

Figure 16:
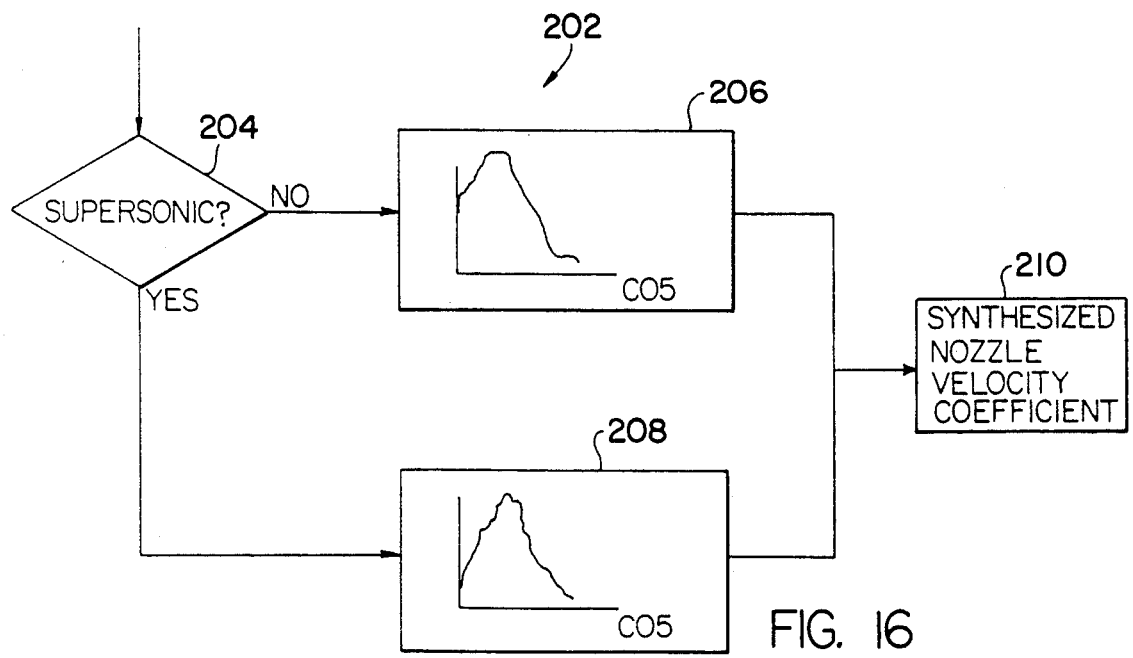
FIG. 16 is a simplified diagram of an algorithm executed by the control system portion of FIG. 4 for synthesizing a value of exhaust gas velocity coefficient for an engine exhaust nozzle.

As seen in FIG. 16, a second calculating mechanism associated with the exhaust nozzle calculating mechanism 92 of FIG. 5 generates, in accordance with algorithm 202, synthesized nozzle velocity coefficient signals from the change in the exhaust nozzle area, speed of the aircraft and the change in the nozzle pressure ratio. Initially, at block 204, the aircraft speed range is determined. If the aircraft is operated in a subsonic mode the synthesized nozzle velocity coefficient signal is generated in accordance with schedule 206, whereas if the aircraft is operated in a supersonic mode schedule 208 is used to generate that signal output at block 210.

Figure 15:
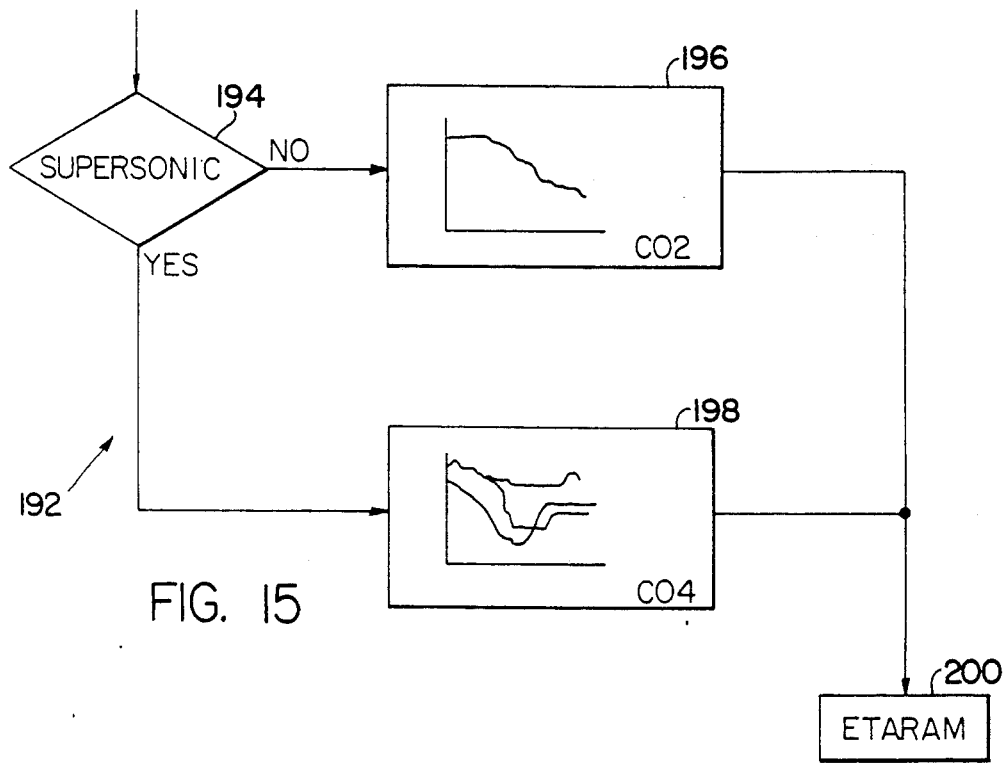
FIG. 15 is a simplified diagram of an algorithm executed by the control system portion of FIG. 4 for computing RAM recovery.

FIG. 15 is a diagram of the operation of an algorithm 192 executed by the scheduling mechanism 95 of FIG. 5. The scheduling mechanism receives signals corresponding to the altitude, speed, and scheduled airflow. At block 194 it is determined whether the aircraft is being operated in supersonic or subsonic speeds. In dependence thereon, a choice of schedules 196 or 198 is utilized in dependence on whether the aircraft is in supersonic or subsonic operation, respectively. A signal corresponding to the base RAM recovery (PT2/PT1) is then output (block 200).

Referring again to FIG. 5, the output signals from the afterburner exhaust nozzle, rotor speed, EPR, airflow, thermodynamic parameter and RAM scheduling mechanisms ar provided along with selected ones of the aircraft engine input signals to a corresponding plurality of computation scheduling mechanisms used to generate selected ones of the partial derivative terms in the slope equation detailed hereinabove. These computation scheduling mechanisms include CV partial derivative signal generator 212, TT8 partial signal generator 214, constants signal generator 216, RAM recovery partial signal generator 218 and afterburner pressure loss partial derivative signal generator 220.

Figure 17:
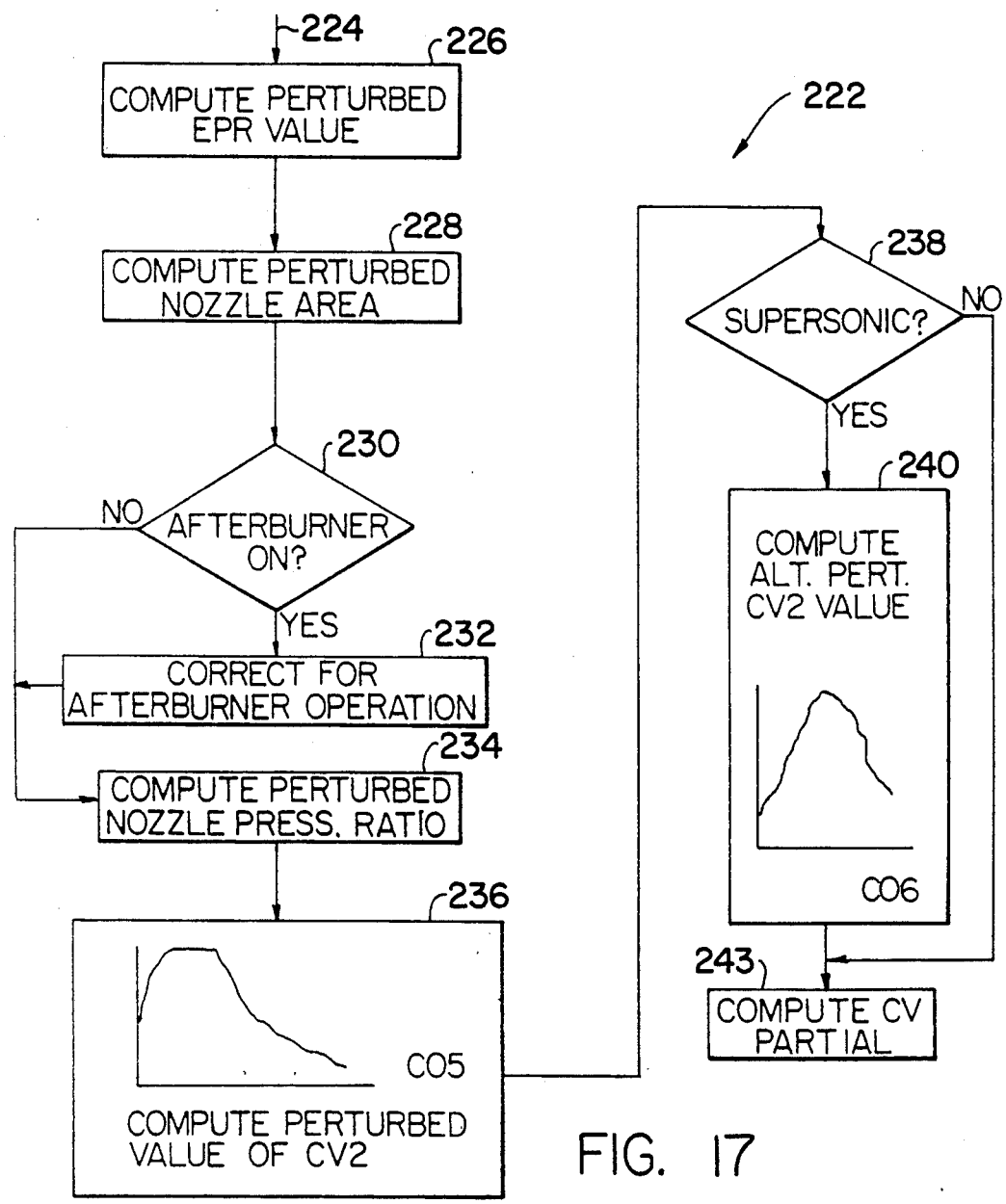
FIG. 17 is a diagram of an algorithm executed by the control system portion of FIG. 4 for generating signals indicative of the partial derivative of synthesized exhaust nozzle gas velocity coefficient with respect to EPR.

Referring now to FIG. 17, there is diagrammatically shown an algorithm 222 executed by the scheduling mechanism 212 of FIG. 5. A plurality of signals are presented on lines 224, including the speed of the aircraft, the throttle lever angle, the afterburner temperature ratio, the RAM recovery, base synthesized nozzle velocity coefficient, change in exhaust nozzle area, percent afterburner pressure loss and base scheduled engine pressure ratio value. An incrementally perturbed value of engine pressure ratio is next selected at block 226, with a perturbed nozzle area computed at block 228. The nozzle area is corrected, should the afterburner be in operation (blocks 230 and 232). Schedule 234 computes a perturbed nozzle pressure ratio. Schedule 236 computes therefrom a slightly perturbed value of synthesized nozzle velocity coefficient. A signal corresponding to this perturbed synthesized nozzle velocity coefficient is altered in dependence on whether the aircraft is in supersonic operation or not (block 238). If the engine is operating above speed of Mach 1, the value of synthesized nozzle velocity coefficient is determined in accordance with schedule 240. A signal corresponding to a partial nozzle velocity coefficient with respect to EPR is computed at block 243 by differencing the base and perturbed synthesized nozzle velocity coefficient values and dividing the difference therebetween by the perturbed change in engine pressure ratio.

Figure 18:
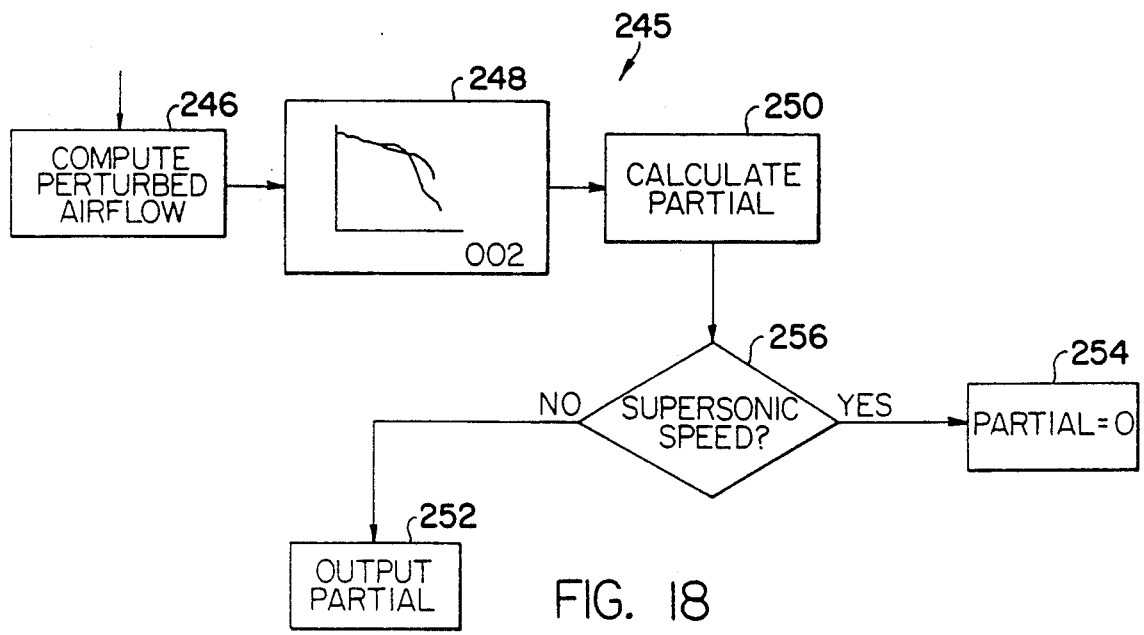
FIG. 18 is a diagram of an algorithm executed by the control system portion of FIG. 4 that generates signals indicative of the total differential of RAM recovery with respect to engine airflow.

In FIG. 18, there is shown a diagrammatic illustration of a portion of the ETARAM partial derivative algorithm 245 executed by the scheduling mechanism 218. At block 246, signals corresponding to the scheduled airflow are received and incrementally perturbed. Perturbed signals therefrom are presented to schedule 248 that outputs a signals which corresponds to the perturbed value of RAM recovery. A signal corresponding to the partial of ETARAM with respect to airflow is calculated at block 250 in a manner similar to that detailed hereinabove. The value of the partial derivative (block 252) is set to zero at blocks 254 should the aircraft be operating at supersonic speeds (block 256).

Figure 19:
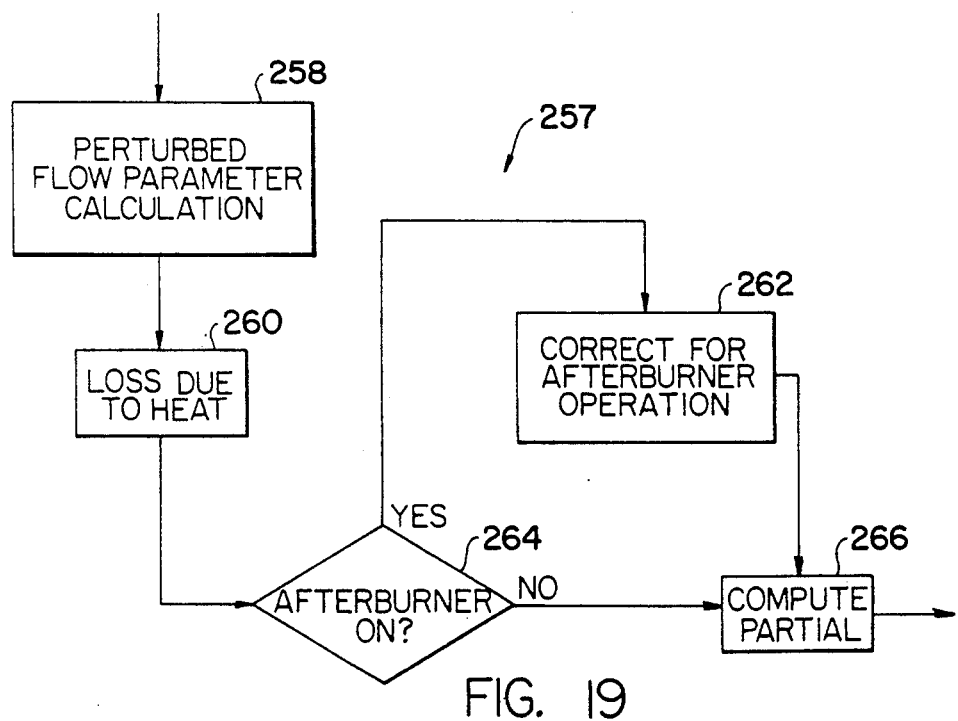
FIG. 19 is a diagram of an algorithm executed by the control system portion of FIG. 4 for generating signals indicative of the partial derivative of the change in afterburner pressure loss as a function of airflow.

FIG. 19 shows a portion of the afterburner total pressure loss partial derivative calculations performed by an algorithm 257 executed by scheduling mechanism 220. As detailed above with respect to other partial derivative terms, it is preferred to compute the afterburner total pressure loss partial differential by using existing values of parameters and adding to these known values small perturbations to get new values These perturbed values are differenced with the existing values to get a value of that partial.

At block 258, a perturbed flow parameter value is computed which is a product of the previously computed flow parameter and on incremental perturbation factor. At block 260, values are computed for additional pressure loss due to afterburner heat of the perturbed conditions. These values are combined with previously determined non-afterburning pressure loss to obtain the perturbed value of afterburner pressure loss if it is determined at block 264 that the afterburner is operating. Should the afterburner not be in operation, no correction is made to the perturbed non-afterburing pressure loss values and a value of delta engine airflow is found from the base and perturbed values of flow parameter. Signals corresponding to the partial change in pressure loss with respect to airflow are calculated at block 266.

Referring again to FIG. 5, constants generator 216 generates a plurality of constants needed in the computation of the constant thrust slope in a known manner using values stored in look-up table format in computer memory associated with the control system. Signals corresponding to the terms presented in equations 7--1 are detailed hereinabove and include $K_{11}$, $K_{12}$, $K_{14}$, $K_{21}$, $K_{31}$, $K_{42}$, $K_{43}$ and $K_{44}$. Signals corresponding to the partial of T8 with respect to EPR are output from scheduling mechanism 214 as detailed above.

Thrust partial scheduling mechanism 268 receives the signals from the scheduling mechanisms as well as other signals including the total temperature at station 8, scheduled EPR, value of ETARAM and the percent afterburner pressure loss and generates therefrom signals corresponding to the thrust partial terms in equation 6. These signals are provided to a constant thrust slope signal generator 270 Which performs the division operation represented in equation 6 to output on lines 272 a signal corresponding to the value of M, the slope of the line of constant thrust.

Figure 20:
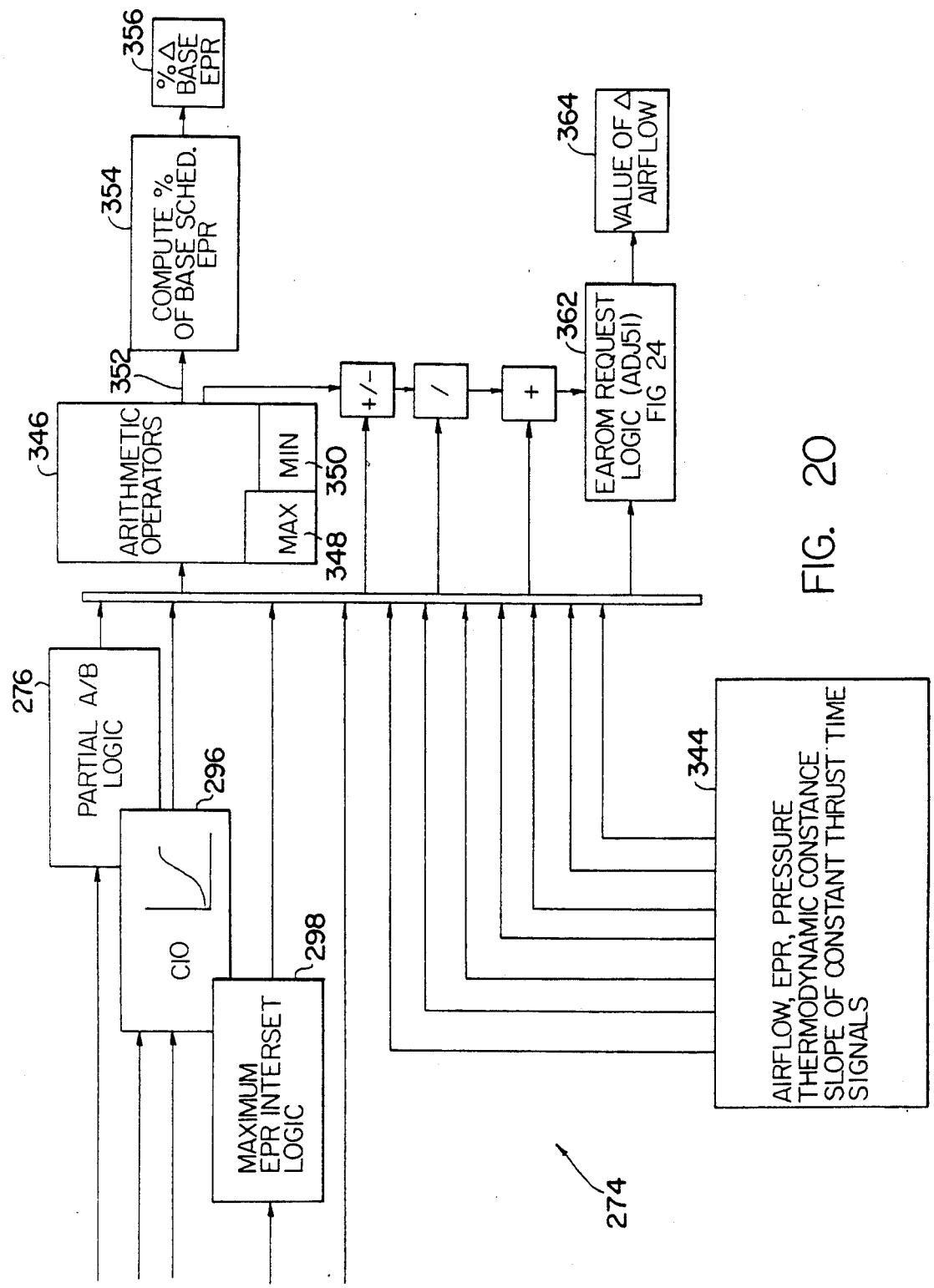
FIG. 20 is a diagram of an algorithm executed by the control system portion of FIG. 4 that generates signals indicative of the change in airflow to be effected to hold engine thrust at a constant value.

FIG. 20 is a simplified schematic illustration showing an additional portion 274 of the control system of FIG. 1. Scheduling mechanism 276 receives signals indicative of the total temperature at station 2, the throttle lever angle, the corrected low rotor speed, the total pressure at station 2 and the scheduled value of engine pressure ratio and generates therefrom signals corresponding to a reduced value of scheduled EPR, in percent, should the afterburner be in operation. Moreover, the magnitude of the reduction is selected in dependence on the throttle lever angle position, with a reduction provided for afterburner sequencing (acceleration).

Figure 21:
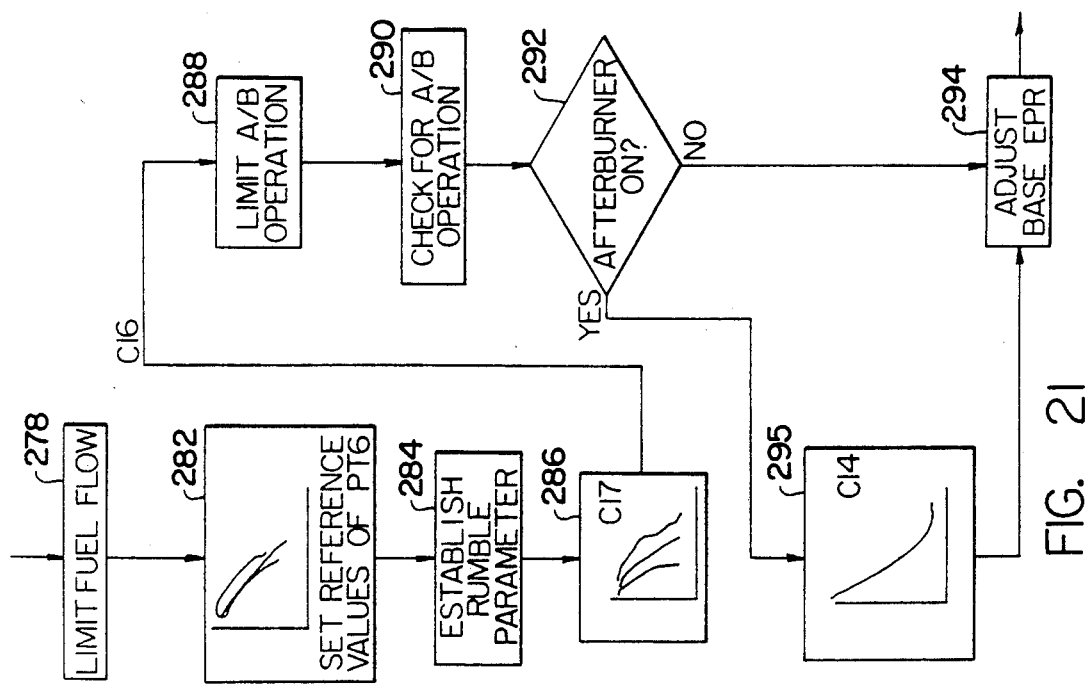
FIG. 21 is a diagrammatic illustration of an algorithm executed by a portion of the control system of FIG. 4 for adjusting a base value of (EPR) in accordance with afterburner operation.

Referring now to FIG. 21, there is a diagrammatic illustration of an algorithm 278 executed by the scheduling mechanism 276. At block 282, signals corresponding to the total pressure at station 6 and a reference total pressure at station 6 are generated. These are used to determine the value of the "rumble" parameter (block 284). As is known in the art, "rumble" corresponds to an afterburner instability caused when excess fuel is delivered to the afterburner. This instability manifests itself as a low-frequency vibration discernable by the pilot within the aircraft. A bypass ratio is determined by schedule 286. This signal is presented to a sub-algorithm schematically indicated at block 288 which limits afterburner operation to prevent "rumble". The sub-algorithm is preferably comprised of a sequence of decision blocks which progressively limit the maximum throttle lever angle in accordance with the "rumble" parameter and bypass ratio. At block 290 the control system determines if the afterburner is, in fact, operational and if so provides signals indicative of how much the engine is downmatched when the afterburner is on (block 292). Those skilled in the art will note that when changes in fuel flow occur in the afterburner, the control system "downmatches" or reduces the value of engine pressure ratio (EPR) from the base EPR schedule by opening the exhaust nozzle. In the present control system, if the signal output at block 294 has a zero value the control system is instructed to operate from the base EPR schedule. A non-zero number instructs the control system to downmatch the value of engine pressure ratio in accordance with schedule 295.

Referring again to FIG. 20, schedule 296 receives total pressure at station 2 signals and low rotor corrected speed signals and generates therefrom a maximum engine pressure ratio (EPR) signal. Scheduling mechanism 298 generates signals in accordance with a "marching technique" corresponding to a maximum engine pressure ratio intersect logic algorithm detailed hereinafter with respect to in FIG. 22. The scheduling mechanism 298 receives signals corresponding to the total pressure at the station 2, the scheduled value of EPR, the slope of the constant thrust line and the scheduled airflow. As shown in FIG. 3, scheduling mechanism 298 is responsible for comparing computed new values of EPR and airflow generated along the line of constant thrust (48) with values along a maximum operating line (47). The initial comparison generates a difference value therebetween. The intersect logic algorithm adjusts the values of engine pressure ratio until the difference between the maximum EPR value for that airflow and the computed value reverses in sign. In sum, the algorithm "marches" the new EPR value to the intersection of the lines of constant thrust and maximum allowable operating line. The maximum operating line output by scheduling mechanism 298 is approximately 5%-6% below that which would constitute engine stall. Those skilled in the art will note that other control techniques can be substituted for the "marching technique" employed by the present control system, but care must be exercised to ensure accuracy and stability.

Figure 22:
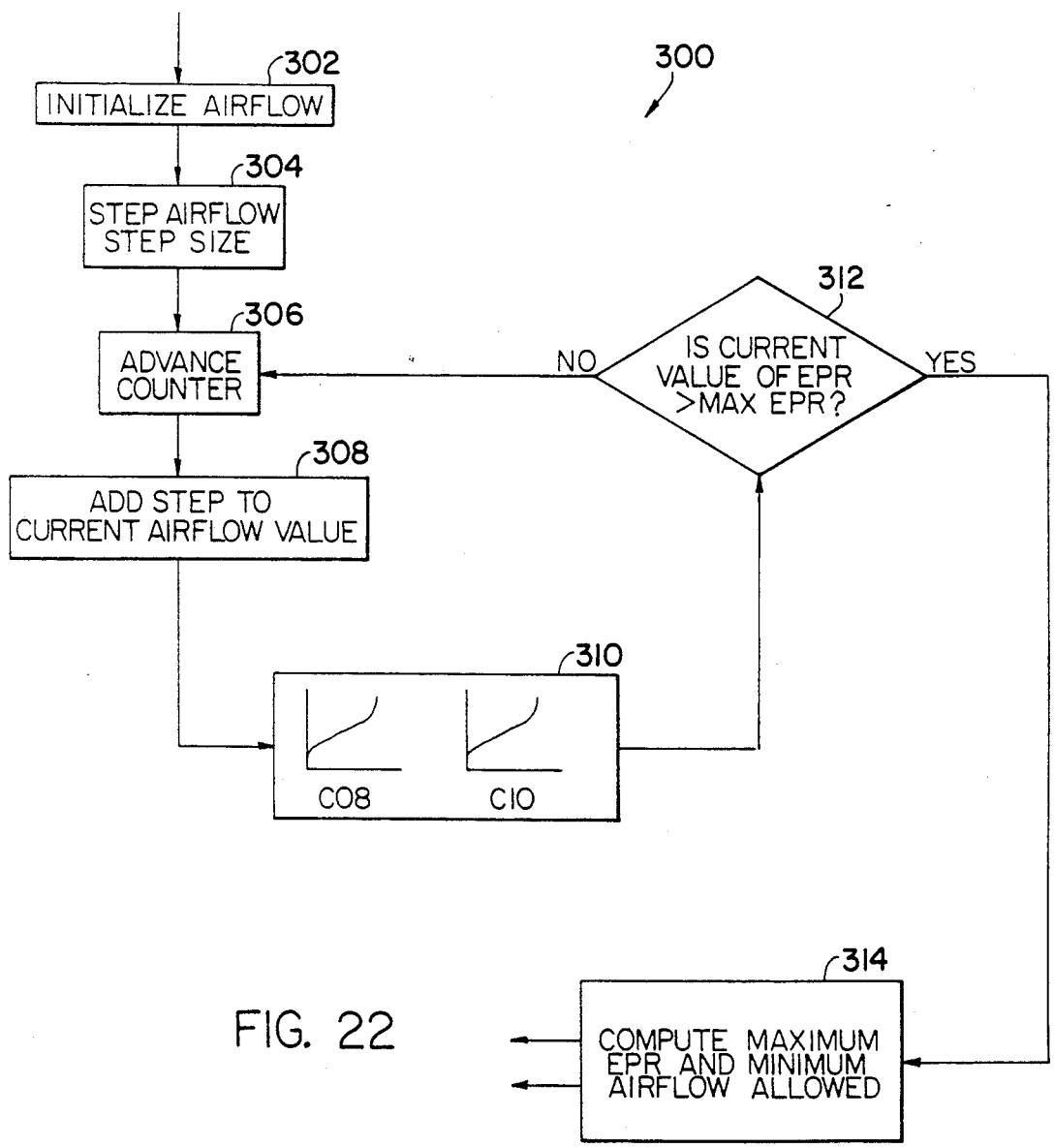
FIG. 22 is a diagrammatic illustration of an iterative algorithm executed by a portion of the control system of FIG. 4 for establishing the maximum EPR and minimum airflow values allowed.

Detailed operation of the present intersect logic is found in algorithm 300 of FIG. 22. At block 302, signals corresponding to the base scheduled airflow are presented. At block 304 the step size of an iteration is set. The size of the step used by the algorithm is typically determined in the trial and error manner. With the present controller, a one pound per step is preferred. Steps larger than one pound produce a quicker solution but a solution which is inherently inaccurate. Steps smaller than one pound in size are accurate, but require excessively long times to be computed. Block 306 indicates that a counter is incremented each time through the iterative loop. At block 308, the present airflow is decreased by the step size and at block 310, signals correspond to the maximum EPR value for that airflow are generated. As is known, gas turbine engines are normally configured with flow versus rotor speed schedules and rotor speed versus engine pressure ratio schedules. Consequently, to generate signals corresponding to a change in engine pressure ratio from a change in airflow, an intermediate schedule must be used.

The computed value of engine pressure ratio is compared at block 312 with the value corresponding to the maximum schedule value. If the computed value is less than the maximum scheduled value, the iteration continues, while if the computed value is greater than the maximum value, the algorithm exits the loop. Values of the EPR maximum and minimum airflow allowed are generated at block 314. Those skilled in the art will note that it is critical that the match point be on a line of constant thrust. As detailed hereinafter, flight test information demonstrate that the present controller operates the engine within 2% of the value of thrust provided by the engine prior to the EEL request.

Referring again to FIG. 20, signals indicative of airflow, engine pressure ratio, line of constant thrust slope and constant signals as generated hereinabove are schematically illustrated at block 344. Signals corresponding to the nozzle area and scheduled engine pressure ratio are passed through arithmetic operator 346 having minimum and maximum operators 348 and 350 which ensure that the final engine pressure ratio value presented on line 352 is within preset limits. The value of the engine pressure ratio EPR is configured at block 354 into a percent of base scheduled EPR and ultimately output at 356 as a signal which modifies the base scheduled EPR by a corresponding amount.

Figure 24:
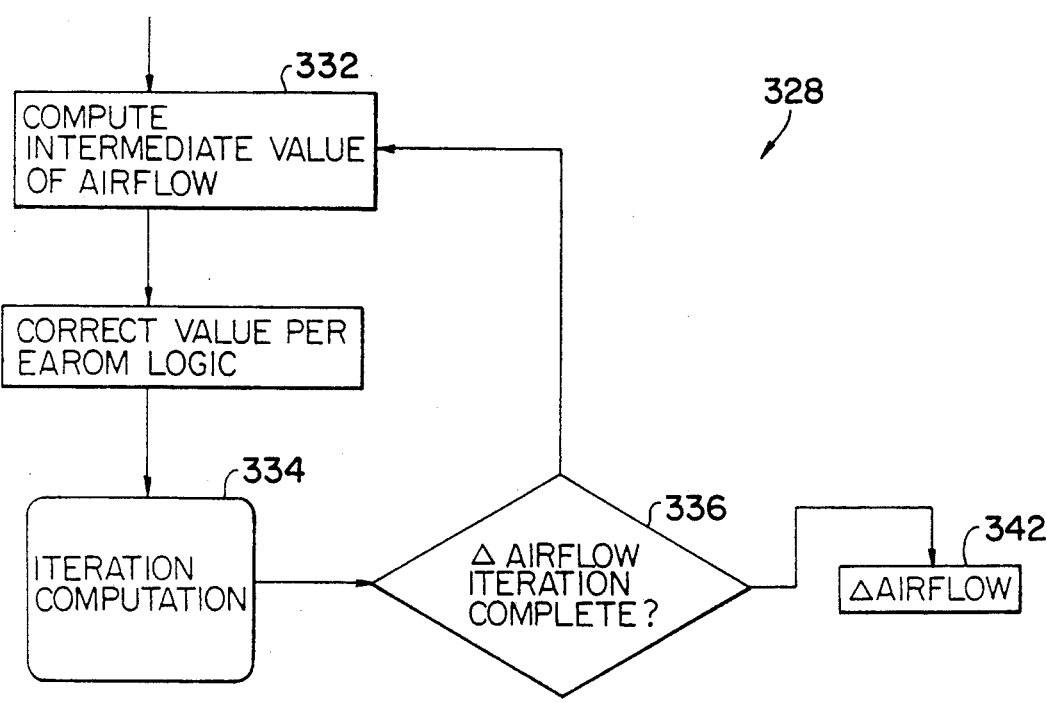
FIG. 24 is a simplified illustration of an iterative algorithm for computing a delta value of requested airflow.

FIG. 24 corresponds to a simplified diagrammatic illustration of an algorithm 328 providing airflow request logic. Signals corresponding to the difference in airflow between the maximum schedule airflow and the base schedule airflow are generated at block 330. At block 332, the trim in airflow caused by the customer adjusted performance reduction generated by the algorithm of FIG. 23 is combined with signals corresponding to the nominal corrected scheduled flow as per the algorithm 316. A value of delta airflow which programs the engine to generate thrust at the exiting value is iteratively computed by a known perturbation technique referred to as an improved Newton-Raphson iteration technique (block 334). Those skilled in the art will note that other control techniques can substitute for the iteration technique employed by the present control system, but care must be exercised in ensuring accuracy and stability. The control system checks to see if the iteration process is complete (block 336). A value of delta airflow is presented at block 342.

Note that, as operating airflow is altered, there is an induced change in the airflow adjustment caused from the operation of the logic in FIG. 23. This is because airflow is not a truly independent variable. Engine pressure ratio is not dependent on airflow such that a single linear relationship exists. A requested change in airflow will, itself, cause a change in delta airflow to compensate for that change. Those skilled in the art will note that the algorithm detailed with respect to FIG. 23 provides a correction which, although small in magnitude, enables the present control system be highly accurate in operation, with a maximum thrust error of less than 2%.

The preferred control system provides an output signal at 364 corresponding to a change in flow from the base scheduled airflow in dependence on the final value of engine pressure ratio (EPR). In essence, the present control system reverses the relationship between airflow and engine pressure ratio in that airflow then becomes the "dependent" variable as compared with the engine pressure ratio. This ensures that the present control system will not provide diverging signal values and this will schedule the engine on the line of constant thrust.

Figure 26:
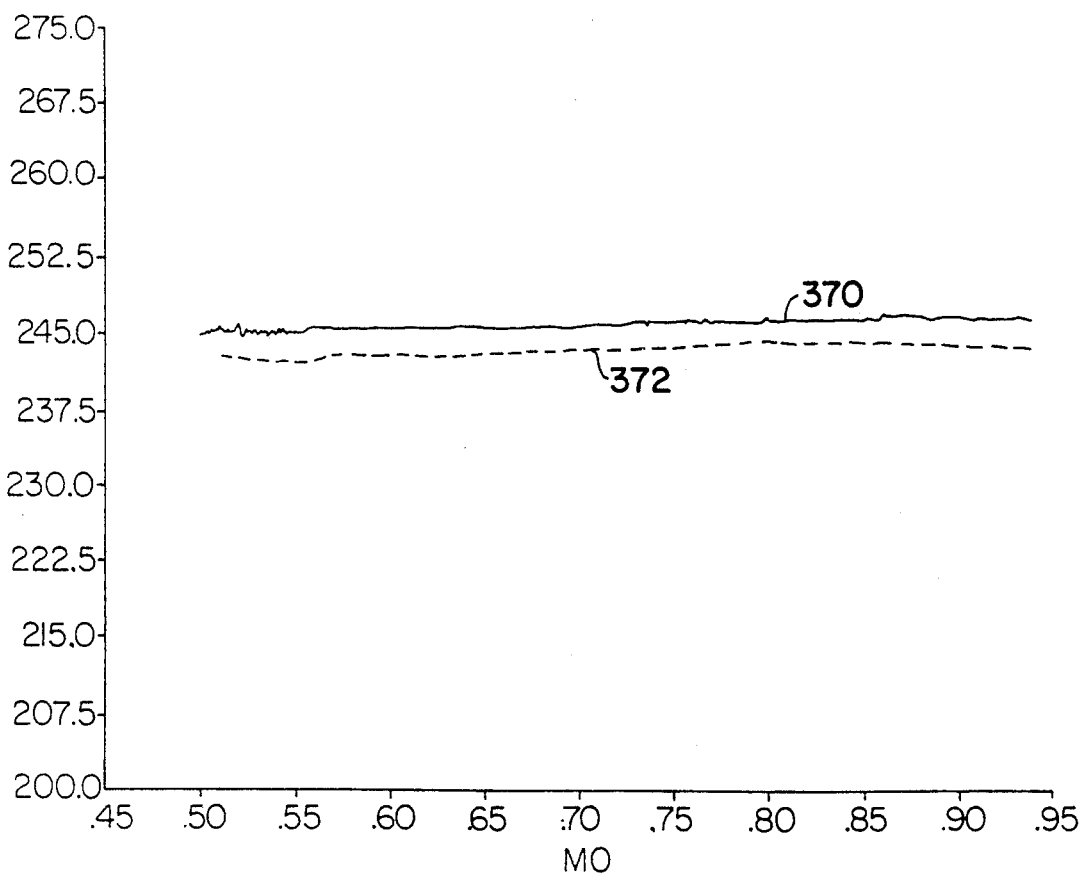
FIG. 26 is a diagrammatic illustration showing the effect of the control system of FIG. 1 on engine airflow as a function of airspeed, as measured in a flight test.
Figure 25:
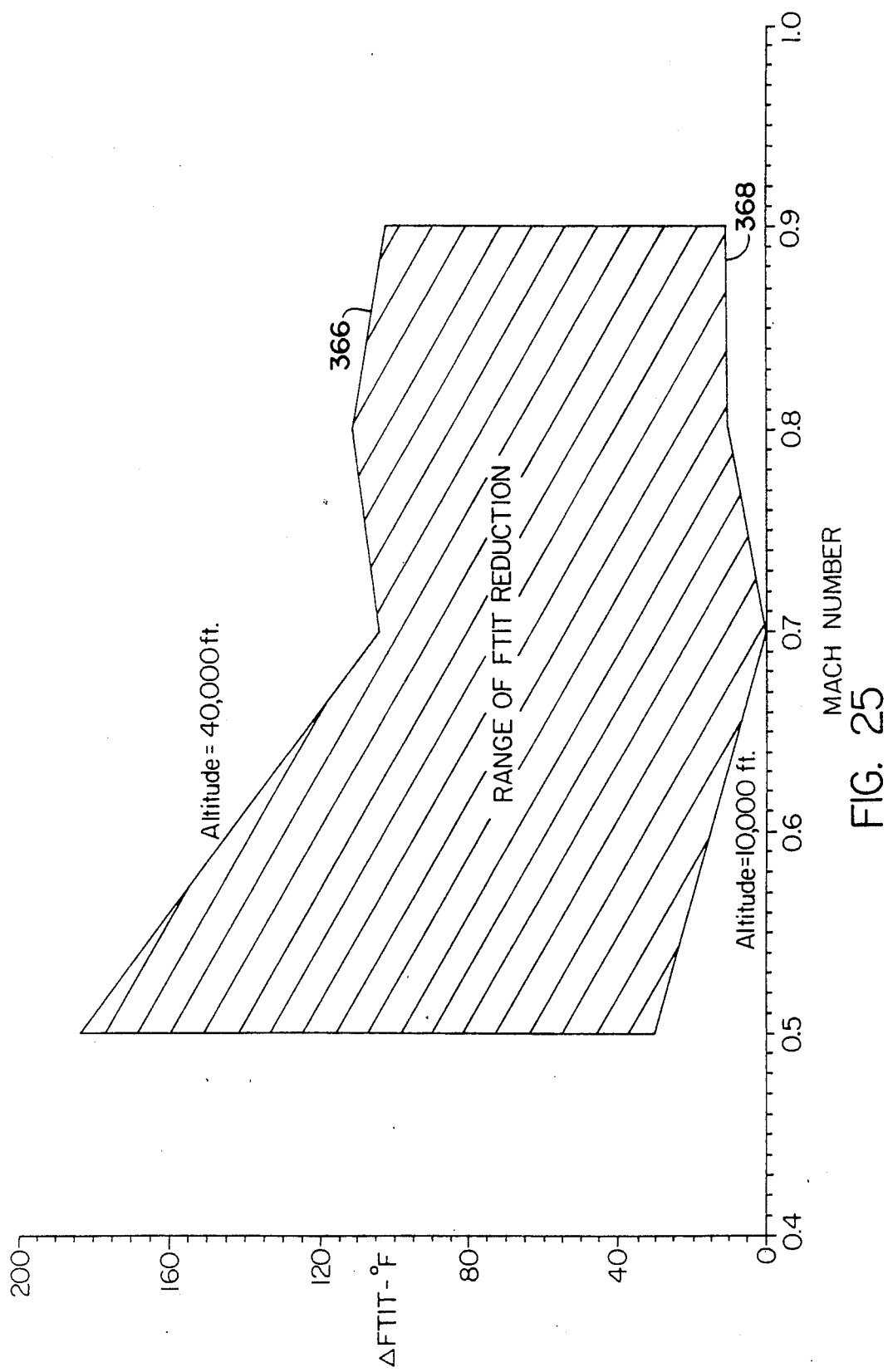
FIG. 25 is a diagrammatic illustration showing the effect of the control system of FIG. 1 on fan inlet turbine temperature as a function of airspeed, as measured in a flight test.
Figure 27:
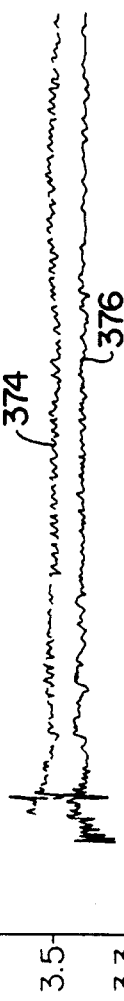
FIG. 27 is a diagrammatic illustration showing the effect of the control system of EPR on engine airflow as a function of airspeed, as measured in a flight test.

Flight test of an aircraft having an engine with the present control system can be seen in FIGS. 25-27. Referring now to FIG. 25, there is a diagrammatic illustration of the measured change in fan turbine inlet temperature ($\Delta$ FTIT) as a function of the aircraft speed (Mach number) at military power highest non-afterburning setting). Curves 366-368 corresponds to the range of FTIT reduction with the extended engine life (EEL) request on. The FTIT reductions at constant thrust can result in at least a 25% increase in the hot section hardware life. It is clear from the figure that there is a significant reduction in fan inlet turbine temperature. FIG. 26 is a diagrammatic illustration of engine airflow and aircraft speed (mach number) at maximum power (full afterburner). Curve 370 corresponds to an engine operating in a normal mode while curve 372 shows the operation of that engine in the extended engine life mode. Note that the engine operates at a reduced airflow of approximately 2.5 lbs./sec.

FIG. 27 displays a difference between EPR as a function of aircraft speed (Mach number) at military power. Curve 374 corresponds to the value of EPR with the engine operating in a normal mode while curve 376 corresponds to the EPR when the engine is operating in the EEL mode. Note that there is approximately 0.1 difference in magnitude therebetween.

Referring now to FIG. 28, there is shown a relationship between thrust and time at 0.9 Mach number (military power). Curve 378 corresponds to the operation of the engine during an uncoupled or normal mode of engine operation while curve 380 corresponds to the thrust output by the engine during the EEL mode of operation. Ideally, both lines should exactly coincide. However, the disparity therebetween is quite minimal, with less than 2% being the maximum.

Figure 29:
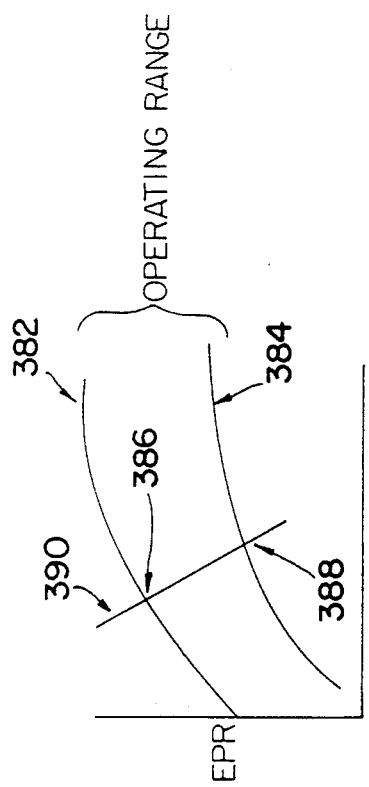
FIG. 29 is a diagrammatic illustration showing an operating range of engine pressure ratio (EPR) as a function airflow for the system of FIG. 4.

The details of the final match point selection process described above are best understood with respect to FIG. 29, curves 382 and 384 respectively correspond to curve a maximum (EPR) schedule operating line and a base schedule operating line. An operating range is determined to be between two points, 386 and 388 which lie on those respective operating lines that connected by a line of constant thrust (curve 390). Point 386 corresponds to the maximum (EPR) value for a minimum value of airflow while point 388 corresponds to the maximum airflow for a minimum value of (EPR). These operating range limits are defined at Block 314 of FIG. 22. Once the operating range is known, the exact operating point in the range must be determined. For example, if the aircraft undergoes a maneuver the initial (EPR) up match request may not require the maximum allowed value of (EPR).

Figure 30:
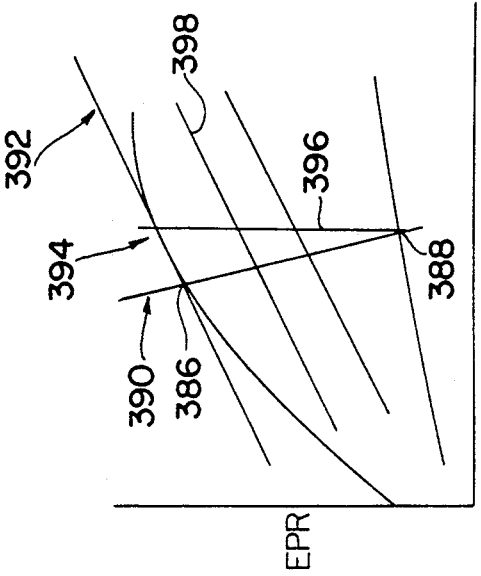
FIG. 30 is a diagrammatic illustration showing the derivation from a goal EPR slope value by the control system of FIG. 4.

In the preferred embodiment the slope of the maximum (EPR) schedule is determined from the goal (EPR) slope to bias the match point logic. As shown in FIG. 30 the goal (EPR) slope (curve 392) is defined by two points on the maximum performance (EPR) schedule operating line. One point being point 386 and the other being an arbitrary point, such as point 394. Point 394 also lies on another line, 396. The two lines will intersect at one unique point.

In general, point 394 has coordinates X2, Y2 in FIG. 30, where Y corresponds to (EPR) and X corresponds to airflow. Similarly point 388 has coordinates X2, Y1. The intersection of lines 392 and 390 (point 386) has coordinates $X_d$, $Y_d$. Line 392 can be expressed with the following equations:

$$Y_z = Y_d = M_b(X_z - X_d) \tag{20}$$

$$\frac{Y_2 - Y_d}{M_b} = X_2 - X_d \tag{21}$$

$$X_d = X_2 + \frac{Y_d - Y_2}{M_b} \tag{22}$$

$$Y_z = Y_1 + \Delta Y \tag{23}$$

$$X_d = X_2 + \frac{Y_d - Y_1 - \Delta Y}{M_b} \tag{24}$$

Similarly line 390 can be expressed using the equations:

$$Y_1 - Y_d = M_a(X_z - X_d) \tag{25}$$

$$\frac{Y_1 - Y_d}{M_a} = X_2 - X_d \tag{26}$$

$$X_d = X_2 + \frac{Y_d - Y_1}{M_a} \tag{27}$$

Setting the expressions for $X_d$ equal to one another yields:

$$Y_d = Y_1 + \frac{\Delta Y}{\left(1 - \frac{M_b}{M_a}\right)} \tag{28}$$

This expression can be rewritten using aircraft parameters $$EPRD = EPRSCH + \frac{DEPR}{1 + \frac{EMGOAL}{RSLOPC}} \tag{29}$$

Note that whereas (DEPR) is related to the (EPR) up match request, the desired value of EPR (EPRD is "scaled" or biased proportionately to the request.

From the above, the present control system will operate in accordance with the maximum EPR (curve 382). However should circumstances prohibit operation along this operating line because of, for example, an aircraft maneuver, the present control system will select a lower operating line on the line of constant thrust (curve 390) roughly corresponding to line 398.

Similarly, although the invention has been shown and described With respect to a best mode embodiment thereof, it should be understood by those skilled in the art that various other changes, omissions and additions thereto may be made therein without departing from the spirit and scope of the invention. Specifically, the present invention is easily adapted for use with any turbo fan engine with appropriate changes and conventional hardware and software.

We claim:

1. An apparatus for controlling thrust from an engine in an aircraft, the engine having a compressor affixed to a spool driven by a turbine, a burner for generating hot exhaust gas and a variable area exhaust nozzle, the engine and aircraft having a plurality of sensors for generating signals indicative of parameters, including altitude and air temperatures and pressures external to and internal to the engine at selected locations thereof, said apparatus comprising:

a means for receiving the aircraft and engine parameter signals; as well as command signals, including signals requesting normal or extended engine life mode of engine operation;

scheduling means responsive to said aircraft parameter signals for generating signals corresponding to a normal engine operational mode comprised of selected values of engine pressure ratio (EPR) as a function of total engine airflow that comprise a standard operating line, said scheduling means further selectively generating signals corresponding to an extended engine life (EEL) operational mode wherein said scheduling means computes a total differential of said engine pressure ratio (EPR) with respect to said total airflow such that a ratio therebetween constitutes a value (M) defining a relationship between engine pressure ratio (EPR) and total airflow (W) corresponding to a value of constant engine thrust and selects values of engine pressure ratio (EPR) as a function of total engine airflow (W) in accordance therewith that comprise an extended engine life (EEL) operating line; and a control means responsive to said pilot command signals for providing signals to said scheduling means for selecting between said normal and extended engine life (EEL) operating modes.

2. The apparatus of claim 1 wherein said engine further comprises an afterburner and wherein said scheduling means alters said standard and extended life mode operating lines in dependence on the operation of said afterburner.

3. The apparatus of claim 1 wherein said parameter signal receiving means receives temperature signals from an inlet of said turbine and said scheduling means selects values of said EPR and airflow to lower said turbine inlet temperature signal value.

4. The apparatus of claim 3 wherein said scheduling means further comprises a means for iteratively determining said values of EPR and airflow at said selected value of engine thrust that compares, for a given value of airflow, a present value of EPR with a maximum value of EPR to generate a difference value therebetween and selecting that value of EPR which reverses the sign of said difference.

5. The system of claim 1 further comprises a synthesizer means for providing to said scheduling means signals corresponding to synthesized values of non-measured aircraft and engine parameters for us in computing said standard and extended engine life (EEL) operating lines.

6. A system for controlling thrust from an engine in an aircraft, the engine having a compressor affixed to a spool driven by a turbine, a burner for generating hot exhaust gas and a variable area exhaust nozzle, said system comprising:

a plurality of engine and aircraft sensors for generating signals indicative of engine and aircraft parameters, including altitude and air temperatures and pressures external to and internal to the engine at selected locations thereof;

a means for receiving the aircraft and engine parameter signals; as well as command signals, including signals requesting normal or extended engine life mode of engine operation;

scheduling means responsive to said aircraft parameter signals for generating signals corresponding to a normal engine operational mode comprised of selected values of engine pressure ratio (EPR) as a function of total engine airflow (W) that comprise a normal operating line, said scheduling means further selectively generating signals corresponding to an extended engine life (EEL) operational mode wherein said scheduling means computes a total differential of said engine pressure ratio (EPR) with respect to said total airflow such that a ratio therebetween constitutes a value (M) defining a relationship between engine pressure ratio (EPR) and total airflow (W) corresponding to constant engine thrust and selects values of engine pressure ratio (EPR) as a function of total engine airflow (W) in accordance therewith that comprise an extended engine life (EEL) operating line; and a control mean responsive to said pilot command signals for providing signals to said scheduling means for selecting between said normal and extended engine life (EEL) operating modes.

7. The system of claim 6 wherein said engine further comprises an afterburner and wherein said scheduling means alters said standard and extended life mode operating lines in dependence on the operation of said afterburner.

8. The apparatus of claim 1 wherein said parameter signal receiving means receives temperature signals from an inlet of said turbine and said scheduling means selects values of said EPR and airflow to lower said turbine inlet temperature signal value.

9. The apparatus of claim 7 wherein said scheduling means further comprises a means for iteratively determining said values of EPR and airflow at said selected value of engine thrust that compares, for a given value of airflow, a present value of EPR with a maximum value of EPR to generate a difference value therebetween and selecting that value of EPR which reverses the sign of said difference.

10. The system of claim 6 further comprises a synthesizer means for providing to said scheduling means signals corresponding to synthesized values of non-measured aircraft and engine parameters for use in computing said standard and extended engine life (EEL) operating line.

11. A method of controlling the thrust from a gas turbine engine in an aircraft, the engine having a compressor affixed to a spool driven by a turbine, a burner for generating hot exhaust gas and a variable area exhaust nozzle, the engine and aircraft having a plurality of sensors for generating signals indicative of parameters, including altitude and air temperatures and pressures external to and internal to the engine at selected locations thereof, said method comprising the steps of:

receiving the aircraft and engine parameter signals as well as command signals, including signals requesting normal or extended engine life mode of engine operation;

generating, in response to said aircraft parameter signals, signals corresponding to a normal engine operational mode comprised of selected values of engine pressure ratio (EPR) as a function of total engine airflow (W) that comprise a normal operating line, said scheduling means further selectively generating signals corresponding to an extended engine life (EEL) operational mode wherein a total differential of said engine pressure ratio (EPR) with respect to said total airflow is computed;

defining a relationship therebetween to constitute a value (M) that establishes a relationship between engine pressure ratio (EPR) and total airflow (W) corresponding to a value of constant engine thrust; and selecting values of engine pressure ratio (EPR) as a function of total engine airflow (W) in accordance therewith that comprise an extended engine life (EEL) operating line.

12. The system of claim 6 wherein said scheduling means further comprises a bias match calculating means for determining a maximum operating line and further computes therefrom, in values of goal EPR slope, said calculating means selecting an arbitrary second value of airflow included on said maximum operating line and on a line of constant airflow value; said bias match calculating means scaling said requested value of EPR (EPRD) in accordance with a ratio between said goal EPR slope and a value of slope of a line of constant engine thrust.

13. The system of claim 12 wherein said scheduling means further comprises means for determining aircraft flight status and selecting an operating line having a lesser value of EPR at said value of constant thrust should the aircraft undergo a maneuver.

* * * * *

UNITED STATES PATENT AND TRADEMARK OFFICE
CERTIFICATE OF CORRECTION

PATENT NO. : 5,048,285

DATED : SEPTEMBER 17, 1991

INVENTOR(S) : THOMAS P. SCHMITT and STEPHEN L. COLLINS

It is certified that error appears in the above-identified patent and that said Letters Patent is hereby corrected as shown below:

Column 1

Line 20, after "tion" please insert --.--.

Column 3

Lines 11-12, please delete.
Line 26, please delete "o: a second" and substitute --of a second--.

Column 10

Equation (12), please delete "$m_g$" and substitute --$\dot{m}_g$--.

Equation (14), please delete "$m_o$" and substitute --$\dot{m}_o$--.

Column 11

Equation (16), please delete "$m_g$" and substitute --$\dot{m}_g$--.

Equation (16), please delete "$\dfrac{\gamma_0}{\gamma_0 - 1}$" and substitute --$\dfrac{\gamma_0}{\gamma_0 - 1}$--.

Equation (19), please delete "$m_g$" and substitute --$\dot{m}_g$--.

UNITED STATES PATENT AND TRADEMARK OFFICE
CERTIFICATE OF CORRECTION

PATENT NO. : 5,048,285
DATED : SEPTEMBER 17, 1991
INVENTOR(S) : THOMAS P. SCHMITT and STEPHEN L. COLLINS It is certified that error appears in the above-identified patent and that said Letters Patent is hereby corrected as shown below:

Column 12

Line 54, please delete "With" and substitute--with--.

Column 14

Line 50, please delete "Which" and substitute--which--.

Column 16

Line 4, please delete "ar" and substitute--are--.
    Line 61, after "values" please insert--.--.

Column 17

Line 28, please delete "Which" and substitute--which--.

UNITED STATES PATENT AND TRADEMARK OFFICE
CERTIFICATE OF CORRECTION

PATENT NO. : 5,048,285

DATED : September 17, 1991

INVENTOR(S) : Thomas P. Schmitt, et al.

It is certified that error appears in the above-identified patent and that said Letters Patent is hereby corrected as shown below:

Column 21, line 43, please delete "With" and substitute-- with--.

Signed and Sealed this

Twelfth Day of January, 1993

Attest:

DOUGLAS B. COMER

*Attesting Officer*      *Acting Commissioner of Patents and Trademarks*